(12) United States Patent
Baur

(10) Patent No.: US 12,393,089 B2
(45) Date of Patent: Aug. 19, 2025

(54) VEHICULAR DRIVER MONITORING SYSTEM WITH CAMERA AND LIGHT EMITTER IN INTERIOR REARVIEW MIRROR

(71) Applicant: Magna Mirrors of America, Inc., Holland, MI (US)

(72) Inventor: Michael J. Baur, Kentwood, MI (US)

(73) Assignee: Magna Mirrors of America, Inc., Holland, MI (US)

( * ) Notice: Subject to any disclaimer, the term of this patent is extended or adjusted under 35 U.S.C. 154(b) by 160 days.

(21) Appl. No.: 18/508,351

(22) Filed: Nov. 14, 2023

(65) Prior Publication Data

US 2024/0168355 A1 May 23, 2024

Related U.S. Application Data

(60) Provisional application No. 63/497,790, filed on Apr. 24, 2023, provisional application No. 63/385,673, (Continued)

(51) Int. Cl.
*G02F 1/163* (2006.01)
*B60R 1/04* (2006.01)
(Continued)

(52) U.S. Cl.
CPC ............ *G02F 1/163* (2013.01); *B60R 1/04* (2013.01); *B60R 1/08* (2013.01); *B60R 1/12* (2013.01);
(Continued)

(58) Field of Classification Search
CPC .. G02F 1/163; B60R 1/04; B60R 1/08; B60R 1/12; B60R 1/1207; B60R 2001/1253; G06V 20/593; G06V 20/597
See application file for complete search history.

(56) References Cited

U.S. PATENT DOCUMENTS 7,626,749 B2  12/2009  Baur et al.
7,914,187 B2  3/2011  Higgins-Luthman et al.
(Continued)

*Primary Examiner* — Scott A Browne
*Assistant Examiner* — Kadyn S Martinez
(74) *Attorney, Agent, or Firm* — HONIGMAN LLP

(57) ABSTRACT

A vehicular driver monitoring system includes a vehicular interior rearview mirror assembly having a mirror head that accommodates a variable reflectance mirror reflective element. A camera is accommodated by the mirror head and views through the variable reflectance mirror reflective element. A light emitter is accommodated by the mirror head and is electrically operable to emit near infrared (NIR) light that passes through the mirror reflective element. Responsive to detection of glare light at the variable reflectance mirror reflective element, the vehicular driver monitoring system electrically reduces the reflectance of the variable reflectance mirror reflective element. Responsive to determining presence of a passenger, the vehicular driver monitoring system limits electrical reduction of the reflectance of the variable reflectance mirror reflective element so that the variable reflectance mirror reflective element provides at least a first minimum threshold transmission level of NIR light passing through the variable reflectance mirror reflective element.

40 Claims, 14 Drawing Sheets

Related U.S. Application Data filed on Dec. 1, 2022, provisional application No. 63/384,128, filed on Nov. 17, 2022.

(51) Int. Cl.
    *B60R 1/08*       (2006.01)
    *B60R 1/12*       (2006.01)
    *G06V 20/59*     (2022.01)

(52) U.S. Cl.
    CPC .......... *B60R 1/1207* (2013.01); *G06V 20/593* (2022.01); *B60R 2001/1253* (2013.01)

(56) References Cited

U.S. PATENT DOCUMENTS

| | | |
|---|---|---|
| 9,405,120 B2 | 8/2016 | Graf et al. |
| 10,017,114 B2 | 7/2018 | Bongwald |
| 10,029,614 B2 | 7/2018 | Larson |
| 10,046,706 B2 | 8/2018 | Larson et al. |
| 10,065,574 B2 | 9/2018 | Tiryaki |
| 10,166,924 B2 | 1/2019 | Baur |
| 10,421,404 B2 | 9/2019 | Larson et al. |
| 10,442,360 B2 | 10/2019 | LaCross et al. |
| 10,948,798 B2 | 3/2021 | Lynam et al. |
| 10,958,830 B2 | 3/2021 | Koravadi |
| 10,967,796 B2 | 4/2021 | Uken et al. |
| 11,214,199 B2 | 1/2022 | LaCross et al. |
| 11,242,008 B2 | 2/2022 | Blank et al. |
| 11,518,401 B2 | 12/2022 | Kulkarni |
| 11,582,425 B2 | 2/2023 | Liu |
| 11,639,134 B1 | 5/2023 | Huizen et al. |
| 11,780,372 B2 | 10/2023 | Sobecki et al. |
| 11,827,153 B2 | 11/2023 | Miller et al. |
| 2015/0009010 A1 | 1/2015 | Biemer |
| 2015/0015710 A1 | 1/2015 | Tiryaki |
| 2015/0022664 A1 | 1/2015 | Pflug et al. |
| 2015/0092042 A1 | 4/2015 | Fursich |
| 2015/0232030 A1 | 8/2015 | Bongwald |
| 2015/0294169 A1 | 10/2015 | Zhou et al. |
| 2015/0296135 A1 | 10/2015 | Wacquant et al. |
| 2015/0352953 A1 | 12/2015 | Koravadi |
| 2016/0137126 A1 | 5/2016 | Fursich et al. |
| 2017/0217367 A1 | 8/2017 | Pflug et al. |
| 2017/0274906 A1 | 9/2017 | Hassan et al. |
| 2017/0355312 A1 | 12/2017 | Habibi et al. |
| 2018/0222414 A1 | 8/2018 | Ihlenburg et al. |
| 2018/0231976 A1 | 8/2018 | Singh |
| 2019/0118717 A1 | 4/2019 | Blank et al. |
| 2019/0146297 A1 | 5/2019 | Lynam et al. |
| 2019/0210615 A1 | 7/2019 | Caron et al. |
| 2019/0258131 A9 | 8/2019 | Lynam et al. |
| 2020/0143560 A1 | 5/2020 | Lu et al. |
| 2020/0202151 A1 | 6/2020 | Wacquant |
| 2020/0320320 A1 | 10/2020 | Lynam |
| 2021/0162926 A1 | 6/2021 | Lu |
| 2021/0291739 A1 | 9/2021 | Kasarla et al. |
| 2021/0323473 A1* | 10/2021 | Peterson ................ B60R 1/025 |
| 2021/0323477 A1 | 10/2021 | LaCross et al. |
| 2022/0242438 A1 | 8/2022 | Sobecki et al. |
| 2022/0254132 A1 | 8/2022 | Rother |
| 2022/0377219 A1 | 11/2022 | Conger et al. |
| 2024/0064274 A1 | 2/2024 | Blank et al. |

\* cited by examiner

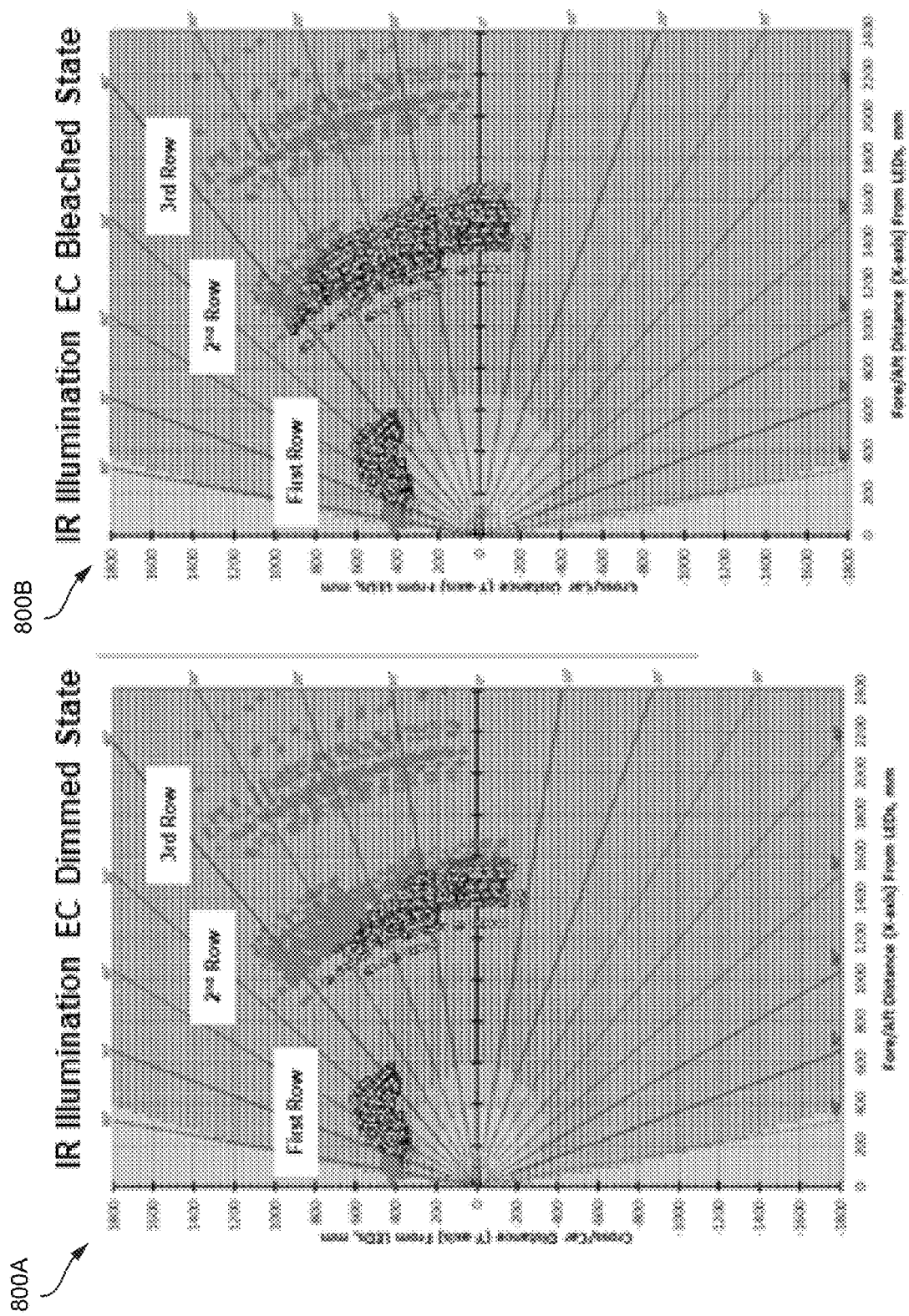

| Test | Condition | Specification |  |
|---|---|---|---|
|  |  | Response Time |  |
| R% Response Time max.-15% | -10.0°C |  | ≤ 6 s |
|  | 23°C |  | ≤ 6 s |
|  | 50.0°C |  | ≤ 10 s |
| R% Response Time min.-50% | -10.0°C |  | ≤ 20 s |
|  | 23°C |  | ≤ 10 s |
|  | 50.0°C |  | ≤ 10 s |
| R% Response Time 65%-35% | -10.0°C |  | ≤ 2 s |
|  | 23°C |  | ≤ 2 s |
|  | 50.0°C |  | ≤ 3 s |

| Test | Condition | Specification |
|---|---|---|
| High End Reflectivity | -10.0°C | ≥ 55% |
|  | 25°C |  |
|  | 50.0°C |  |
| Low End Reflectivity | -10.0°C | ≤ 15% |
|  | 25°C |  |
|  | 50.0°C | ≤ 20% |

FIG. 9

VEHICULAR DRIVER MONITORING SYSTEM WITH CAMERA AND LIGHT EMITTER IN INTERIOR REARVIEW MIRROR

CROSS REFERENCE TO RELATED APPLICATIONS

The present application claims the filing benefits of U.S. provisional application Ser. No. 63/497,790, filed Apr. 24, 2023, U.S. provisional application Ser. No. 63/385,673, filed Dec. 1, 2022, and U.S. provisional application Ser. No. 63/384,128, filed Nov. 17, 2022, which are hereby incorporated herein by reference in their entireties.

FIELD OF THE INVENTION

The present invention relates generally to the field of interior rearview mirror assemblies for vehicles.

BACKGROUND OF THE INVENTION

It is known to provide a mirror assembly that is adjustably mounted to an interior portion of a vehicle, such as via a single or double ball pivot or joint mounting configuration where the mirror casing and reflective element are adjusted relative to the interior portion of a vehicle by pivotal movement about the single or double ball pivot configuration. The mirror casing and reflective element are pivotable by a user that is adjusting a rearward field of view of the reflective element.

SUMMARY OF THE INVENTION

The present invention provides an interior rearview mirror assembly that includes a variable reflectance mirror reflective element. The rearview mirror assembly accommodates a driver monitoring camera and an infrared (IR) or near infrared (NIR) light emitter for a driver monitoring system (DMS) or occupant monitoring system (OMS) of the vehicle. When the variable reflectance mirror reflective element is electrically powered to dim the rearview mirror (i.e., reduce reflectance of the reflective element) and thus decrease light transmissivity of the reflective element, IR and NIR light transmissivity of the mirror reflective element is reduced and thus functionality of the DMS or OMS is reduced. Thus, the DMS or OMS limits dimming of the reflective element to provide threshold levels of IR and NIR light transmissivity of the mirror reflective element. Optionally, the IR or NIR light emitters of the DMS/OMS may emit light at an increased intensity when the mirror reflective element is dimmed.

For example, a vehicular interior rearview mirror assembly is configured to attach at an interior portion of a vehicle equipped with a vehicular driver monitoring system and includes a mirror head adjustable about a mounting structure. The mirror head includes a variable reflectance mirror reflective element and reflectance of the variable reflectance mirror reflective element is adjusted responsive to an electrical current applied to the variable reflectance mirror reflective element. A camera is accommodated by the mirror head and operable to capture image data, and the camera views through the variable reflectance mirror reflective element. An electronic control unit (ECU) includes electronic circuitry and associated software, and the electronic circuitry includes an image processor configured to process image data captured by the camera for a driver monitoring system (DMS) or an occupant monitoring system (OMS) of the vehicle. A light emitter is accommodated by the mirror head and operable, when electrically powered to emit light, to emit infrared (IR) light or near infrared (NIR) light. The light emitter, when electrically powered to emit light, emits IR light or NIR light that passes through the mirror reflective element to illuminate at least a portion of the interior cabin of the vehicle. With the interior rearview mirror assembly attached at the interior portion of the vehicle and when the light emitter is electrically powered to emit light, the camera captures image data representative of IR light or NIR light reflected from objects at the portion of the interior cabin of the vehicle that passes through the variable reflectance mirror reflective element. The vehicular driver monitoring system is operable to adjust a level of electrical current applied to the mirror reflective element to adjust reflectance of the mirror reflective element. For example, the system may, responsive to detection of glare light at the variable reflectance mirror reflective element, adjust the electrical current applied to the variable reflectance mirror reflective element to reduce the reflectance of the variable reflectance mirror reflective element. The vehicular driver monitoring system, responsive to processing at the ECU of image data captured by the camera, determines presence of a passenger at a passenger region of the vehicle. Responsive to determining presence of the passenger, the vehicular driver monitoring system limits reduction of the reflectance of the mirror reflective element so that the variable reflectance mirror reflective element provides at least a first minimum threshold transmission level for IR light and NIR light passing through the mirror reflective element. For example, the system may set a minimum level of reflectance of the variable reflectance mirror reflective element where, when the reflectance is adjusted based on the glare light levels at the mirror reflective element, the reflectance may not be adjusted below the minimum level of reflectance. Optionally, the system may set a maximum voltage supplied to the variable reflectance mirror reflective element for reducing reflectance of the variable reflectance mirror reflective element so that the reflectance may not be reduced below a level corresponding to the maximum voltage. Further, the minimum level of reflectance and/or maximum voltage may be adjusted and/or determined based on an operating temperature at the mirror assembly.

These and other objects, advantages, purposes and features of the present invention will become apparent upon review of the following specification in conjunction with the drawings.

BRIEF DESCRIPTION OF THE DRAWINGS

FIGS. 8A and 8B are diagrams showing near infrared illumination based on cross-car distance and fore/aft distance from the light emitters, showing the illumination for the EC mirror in the dimmed state and in the bleached state;

FIG. 9 is a chart showing change in response time for an EC cell based on the temperature of the EC cell;

DESCRIPTION OF THE PREFERRED EMBODIMENTS

Figure 1:
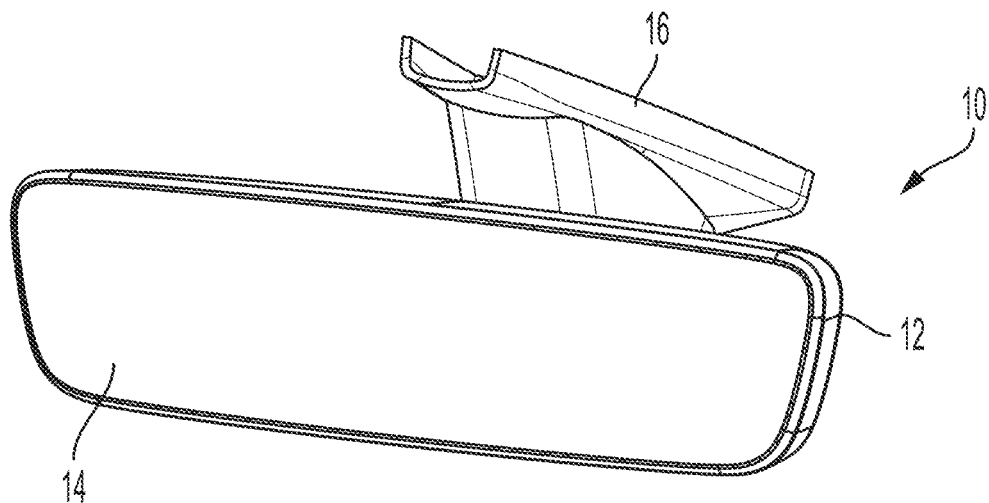
FIG. 1 is a perspective view of an interior rearview mirror assembly having a driver monitoring camera and an infrared or near infrared light emitter.

Referring now to the drawings and the illustrative embodiments depicted therein, an interior rearview mirror assembly 10 for a vehicle includes a casing 12 and a reflective element 14 positioned at a front portion of the casing 12 (FIG. 1). In the illustrated embodiment, the mirror assembly 10 is configured to be adjustably mounted to an interior portion of a vehicle (such as to an interior or in-cabin surface of a vehicle windshield or a headliner of a vehicle or the like) via a mounting structure or mounting configuration or assembly 16. The mirror reflective element 14 comprises a variable reflectance mirror reflective element that varies its reflectance responsive to electrical current applied to conductive coatings or layers of the reflective element.

Figure 2:
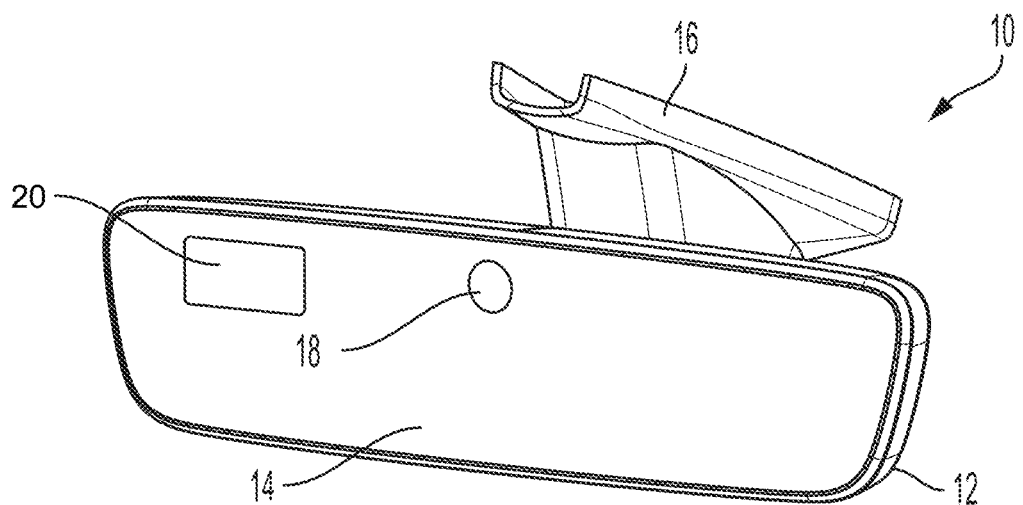
FIG. 2 is another perspective view of the interior rearview mirror assembly, showing the DMS camera behind the reflective element.
Figure 3:
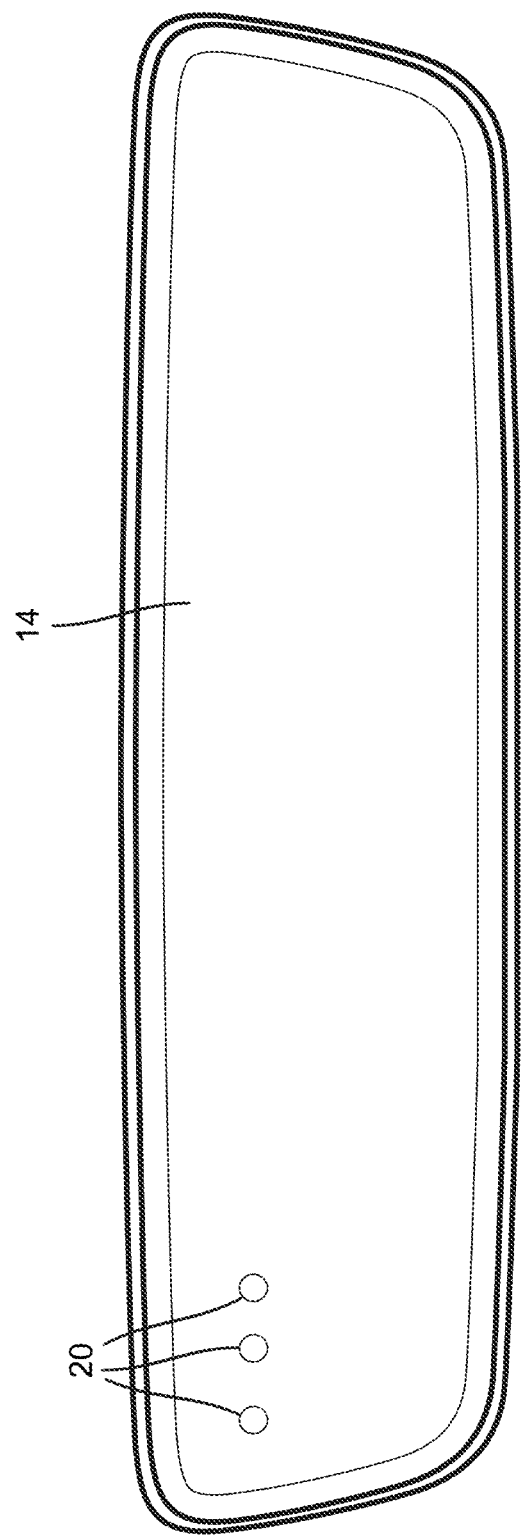
FIG. 3 is a plan view of the interior rearview mirror assembly.

The mirror assembly 10 includes or is associated with a driver monitoring system (DMS) and/or an occupant monitoring system (OMS), with the mirror assembly comprising a driver/occupant monitoring camera 18 disposed at a back plate (and viewing through an aperture of the back plate) behind the reflective element 14 and viewing through the reflective element 14 toward at least a head region of the driver of the vehicle (FIG. 2). The DMS includes an infrared light (IR light) or near infrared light (near IR light) emitter 20 disposed at the back plate and emitting IR light or near IR light that passes through another aperture of the back plate and through the reflective element 14 (FIG. 3). The monitoring system may utilize aspects of driver monitoring systems or occupant monitoring systems described in U.S. Publication No. US-2022-0377219, and/or International Publication Nos. WO 2023/034956; WO 2022/241423 and/or WO 2022/187805, which are all hereby incorporated herein by reference in their entireties.

With the DMS camera 18 disposed in the mirror head, the camera moves together and in tandem with the mirror head (including the mirror casing 12 and mirror reflective element 14 that pivot at a pivot joint that pivotally connects the mirror head to the mounting structure 16 of the interior rearview mirror assembly that in turn mounts at a windshield or at a headliner of the equipped vehicle), such that, when the driver aligns the mirror to view rearward, the camera is positioned so as to view at least the driver of the vehicle. The location of the DMS camera 18 and IR LED(s) 20 at the mirror head provide an unobstructed view to the driver. The driver monitoring camera 18 may also provide captured image data for an occupancy monitoring system (OMS) or another separate OMS camera may be disposed at the mirror assembly for the OMS function.

The mirror assembly includes a printed circuit board (PCB) having a control or electronic control unit (ECU) comprising electronic circuitry (disposed at the circuit board or substrate in the mirror casing), which includes driver circuitry for controlling dimming of the mirror reflective element. The circuit board (or a separate DMS circuit board) includes a processor that processes image data captured by the camera 18 for monitoring the driver and determining, for example, driver attentiveness and/or driver drowsiness. The driver monitoring system includes the driver monitoring camera 18 and may also include the occupant monitoring camera (or the driver monitoring camera may have a sufficiently wide field of view so as to view the occupant or passenger seat of the vehicle as well as the driver region), and may provide occupant detection and/or monitoring functions as part of the OMS. The DMS/OMS ECU may be disposed within the mirror head along with the camera and light emitter. Optionally, the ECU may be disposed at the vehicle remote from the mirror head and/or the interior rearview mirror assembly, and may be electrically connected to and in communication with the camera and light emitter via a cable, such as a coaxial cable or a twisted pair wire or cable or the like.

The one or more infrared (IR) or near infrared light emitters 20 (such as IR or near-IR light emitting diodes (LEDs) or vertical-cavity surface-emitting lasers (VCSEL) or the like) are disposed at the back plate behind the reflective element 14 and emit near infrared light that passes through the aperture of the back plate and through the reflective element toward the head region of the driver of the vehicle and, optionally, the head region of the passenger of the vehicle.

The driver monitoring camera 18 and system may utilize any suitable driver monitoring camera and system to capture image data of an interior portion of the vehicle, such as respective head regions of a driver and/or one or more occupants of the vehicle. The driver monitoring camera and near-IR LED(s) may utilize aspects of the driver monitoring systems described in U.S. Publication Nos. US-2022-0254132; US-2022-0242438; US-2021-0323473 and/or US-2021-0291739, and/or U.S. Publication No. US-2022-0377219, and/or International Publication Nos. WO 2023/034956; WO 2022/241423 and/or WO 2022/187805, which are all hereby incorporated herein by reference in their entireties.

The mirror assembly may comprise an auto-dimming mirror reflective element (e.g., an electrochromic mirror reflective element) or a prismatic mirror reflective element. For a prismatic mirror, when the head or housing is set to a particular orientation by the driver of an equipped vehicle, a toggle operable by the driver moves the housing and reflective element to flip upward/downward, typically by about 4 degrees, to switch between a daytime or non-glare reducing position (where the driver views reflections at the mirror reflector of the mirror reflective element) and a nighttime or glare reducing position (where the driver views reflections at the surface of the glass substrate of the mirror reflective element). With the auto-dimming mirror, there is typically no movement once the mirror head is set for the particular driver.

Both types of mirrors may be provided with a video display screen that is disposed behind and is viewable through the mirror reflective element. Such video mirrors include a backlit LCD display screen, and a particular form of video mirror is a full display mirror (such a ClearView™ Interior Rearview Mirror Assembly available from Magna Mirrors of America, Inc. of Holland, MI USA, or an FDM™ Interior Rearview Mirror Assembly available from Gentex Corporation of Zeeland, MI USA), where the video display screen fills the reflective region, such as is by utilizing aspects of the mirror assemblies and systems described in U.S. Pat. Nos. 11,242,008; 11,214,199; 10,442,360; 10,421, 404; 10,166,924; 10,046,706 and/or 10,029,614, and/or U.S. Publication Nos. US-2021-0162926; US-2019-0258131; US-2019-0146297; US-2019-0118717 and/or US-2017-0355312, which are all hereby incorporated herein by reference in their entireties. In that type of a dual-mode interior rearview mirror, the EC mirror head moves when switching from a traditional reflection mode or mirror mode to a live-video display mode.

For prismatic mirrors and full mirror display mirrors, the driver initially lines up the mirror by looking at the mirror reflector to see rearward of the vehicle. When the mirror is flipped up (such as to switch to the glare-reducing position of the prismatic mirror or to switch to the video display mode of the video mirror), the DMS may be flipped downward by a similar degree to maintain its principal viewing axis toward the driver. Optionally, the DMS camera may have a large enough field of view so the desired regions are not outside of the camera's view when the mirror is flipped.

Furthermore, the interior rearview mirror assembly 10 may provide a position memory function where a position of the mirror head relative to the mounting structure 16 is stored in memory (such as in memory storage at the ECU) and responsive to an input, an actuator at the interior rearview mirror assembly is electrically operable to adjust the position of the mirror head relative to the mounting structure to match or correspond to the position stored in memory. For example, the interior rearview mirror assembly position memory function may include characteristics of the position memory functions and actuators described in U.S. Publication No. US-2021-0323477, which is hereby incorporated herein by reference in their entireties.

As discussed further below, the transmission of IR light and near IR light from the light transmitters 20 and through the mirror reflective element 14 is a critical feature for the DMS system. IR and near IR light transmission through the mirror reflective element 14 must be high enough for the DMS camera 18 and/or OMS camera to capture image data representative of the reflected light. In other words, because the IR light or near IR light emitted by the light emitter 20 passes through the mirror reflective element 14, reflects from objects within the vehicle cabin and passes back through the mirror reflective element 14 to be viewed by the camera 18 capturing image data, the transmissivity of the mirror reflective element 14 for IR light and near IR light impacts quality of the image data captured by the camera 18. As the transmissivity of the mirror reflective element 14 decreases, the quality and/or reliability of the captured image data decreases and thus operation of the DMS and/or OMS of the vehicle is adversely affected. In particular, illuminating the passenger position (e.g., the head region of the passenger of the vehicle) is a challenge for near infrared illumination. That is, emitting IR light or near IR light toward the passenger position and/or capturing IR light or near IR light reflected from the passenger position is difficult for DMS cameras that are disposed behind and view through the mirror reflective element.

Dimming of the electrochromic (EC) mirror may reduce near infrared light transmission through the EC mirror reflective element 14. For example, see the diagram 400 of FIG. 4, which charts a percentage of visible light reflectivity of light reflected from the mirror reflective element (representative of visible light transmission through the EC medium of the mirror reflective element) (y-axis) against a percentage of near infrared transmission loss of light passing through the mirror reflective element (at the 940 nanometer wavelength) (x-axis) for a plurality of mirror reflective elements. As shown, as visible light reflectivity of the mirror reflective element 14 decreases (i.e., the mirror reflective element is dimmed and a smaller percentage of visible light incident at the mirror reflective element is reflected from the mirror reflective element), the near infrared transmission loss increases (i.e., a smaller percentage of IR light or near IR light incident at the mirror reflective element passes through the mirror reflective element). Thus, when the EC mirror reflective element is dimmed, such as to reduce glare from other vehicle headlights behind the vehicle, near infrared light transmission through the mirror reflective element 14 is reduced and thus captured image data (representative of reflection of the emitted IR or NIR light) is depreciated. The condition may be worse for illumination of the passenger position versus the driver position, such as due to the angles of the light emitters relative to the mirror reflective element and relative to the passenger position. That is, with the mirror head adjusted to provide the rearward field of view to the driver of the vehicle, the camera and the light emitter are directed toward the driver of the vehicle and thus less near IR light is emitted toward the passenger side of the vehicle. As such, the system may more easily lose sight of or be unable to monitor the passenger when quality of image data is reduced due to reductions in near IR light transmission through the mirror reflective element. The system may include near IR light emitters that are directed toward the passenger seat area, but those may not be energized or the emitted near IR light that passes through the reflective element may not be sufficient for adequate occupant detection or monitoring.

Dimming of the EC mirror reflective element 14 may be adjusted based on a determined glare light level at the vehicle. That is, a glare light sensor may be disposed at the vehicle (or optionally, processing of image data captured by the DMS/OMS camera or other vehicular camera may provide the glare light function) and the level of visible light transmission of the mirror reflective element 14 may be adjusted based on the detected glare light level. For example, if the detected glare light level is relatively low (e.g., no headlights are present in the view of the mirror reflective element), then the light transmissivity of the mirror reflective element (i.e., the light transmissivity of the electrochromic medium) may be increased to increase the near infrared light transmission (and optionally, visible light transmission) through the mirror and improve quality of the image data captured by the DMS/OMS camera(s). When detected glare light level is relatively high (e.g., headlights are present in the view of the mirror reflective element), then the light transmissivity of the electrochromic medium of the mirror reflective element may be decreased (i.e., the mirror reflective element may be dimmed further) to reduce the glare to the driver. Thus, the system may actively respond to glare light at the mirror so that, when glare light is not present at the mirror, DMS and OMS image quality may be improved.

To improve the quality of image data captured by the DMS camera and/or OMS camera, the system may reduce or limit the amount of dimming of the mirror reflective element 14 during operation of the DMS/OMS. In other words, the system limits the reduction of visible light transmissivity of the mirror reflective element 14 (e.g., the system sets a minimum threshold level of light transmissivity of the mirror reflective element and/or the system sets a maximum threshold level of dimming of the mirror reflective element) to limit the loss of near infrared transmission caused by the dimming of the mirror. The system thus dynamically sets the minimum transmissivity level or maximum dimming level based in part on presence of an occupant in the vehicle. Because reducing the amount of dimming reduces the dimming of the glare from incoming headlights (and thus may affect the ability of the driver to view objects in the reflections at the mirror reflective element), the system may determine how much or when to reduce dimming. That is, dimming of the EC mirror reflective element 14 may be adjusted based on a determined condition to adjust near infrared transmission through the mirror reflective element 14.

For example, the system may process captured image data to determine presence of a passenger in the vehicle (sitting in a passenger seat of the vehicle and not in the driver seat) and the system may limit dimming of the mirror reflective element when a passenger is detected in the vehicle. That is, because the system requires a greater level of IR or near IR illumination to view the passenger as compared to a level of IR or near IR illumination required to view the driver, the system may limit dimming of the mirror reflective element 14 when the passenger is present so that the camera captures a greater portion of IR or near IR light incident at the mirror reflective element to ensure that the OMS receives suitable quality image data. For example, when presence of the passenger is determined, the system may reduce dimming of the EC mirror reflective element (i.e., increase the level of visible light transmission of the mirror reflective element) and/or apply a maximum threshold level of dimming of the mirror reflective element when adjusting dimming of the mirror reflective element based on glare light levels determined at the vehicle. Thus, if the system determines presence of a passenger in the passenger-side front seat of the vehicle, the system may adjust dimming of the mirror reflective element to increase near infrared light transmission (and visible light transmission) through the mirror reflective element. In other words, the system has the capability to detect the passenger and as such, the system can adjust the dimming curve via software changes.

When the system does not detect a passenger in the vehicle (e.g., only a driver is present in the driver seat of the vehicle), the system may permit a higher level of dimming to provide better glare light reduction from the mirror reflective element. For example, when presence of the passenger is not determined, the system may increase dimming of the EC mirror reflective element (i.e., decrease the level of visible light transmission of the mirror reflective element) and/or apply a maximum threshold level of dimming of the mirror reflective element when adjusting dimming of the mirror reflective element that is greater than the maximum threshold level of dimming applied when the passenger is determined. That is, if the system does not determine presence of a passenger in the passenger seat of the vehicle, the system may adjust dimming of the mirror reflective element to a greater degree of dimming (than it would if a passenger were detected) and thus may reduce near infrared light transmission (and optionally, visible light transmission) through the mirror reflective element. Although this decreases near infrared light transmission, a lower level of near infrared light transmission is required to provide the DMS function as compared to the level of near infrared light transmission required to provide the OMS function and the increased dimming reduces the effect of glare light incident at the mirror reflective element for the driver viewing the mirror reflective element.

Thus, the system is operable to adjust the level of dimming (i.e., the light transmissivity and reflectance) of the mirror reflective element, such as by adjusting the level of electric current applied to the mirror reflective element. When the passenger is detected, the system may limit dimming so as to limit reductions in the transmissivity and reflectance of the mirror reflective element, such as to provide a threshold transmission level of IR light and near IR light through the mirror reflective element (such as a transmission level of at least 99 percent, at least 95 percent, at least 90 percent, at least 80 percent, at least 60 percent, at least 50 percent, or any suitable transmission rate of IR or near IR light). When the passenger is not detected, the system may not limit dimming of the mirror reflective element, or the system may limit dimming to a lesser degree, such as to provide a second threshold transmission level that is less than the first threshold transmission level. That is, the second minimum level of near infrared light transmissivity selected for DMS only is less than the first minimum level of near infrared light transmissivity selected for OMS (as well as DMS).

Thus, when a passenger is not present in the front passenger seat, and when glare light is detected at the mirror reflective element, such as glare light emanating from a rear approaching vehicle at night approaches the equipped vehicle with high beams activated, reflectance of the EC cell automatically reduces to a minimum reflectance level that is less than 10 percent reflectance level, such as, for example, less than 7 percent reflectance level (but remains greater than 4 percent reflectance). However, in a similar scenario, but with a passenger present in the front passenger seat, the minimum reflectance level is limited to a setting that is greater than 10 percent reflectance, such as, for example, 15 percent reflectance or 20 percent reflectance.

Optionally, the system may adjust light transmissivity of the mirror reflective element (or adjust a limit to reduction of reflectance or light transmissivity or a limit on dimming) in response to a determination that image data captured by the camera is not suitable for the DMS and/or OMS function. For example, if the quality of the captured image data is reduced such that the DMS is unable to determine facial features or track eye position of the driver or such that the OMS is unable to monitor the passenger, the system may increase near IR light transmission (e.g., by limiting dimming of the mirror reflective element) to increase the amount of near IR light that passes through the mirror reflective element (e.g., near IR light emitted by the near IR light emitter and near IR light reflected off objects and passing through the mirror reflective element to the camera) so as to improve the quality of image data captured by the camera. That is, if near IR light transmission is reduced (via an increase in dimming of the mirror reflective element) to a point that image data captured by the camera is unable to be processed for the DMS and/or OMS, the system may decrease the dimming of the mirror reflective element (or set a lower limit on the level of dimming allowed) to increase the near IR light transmission and improve quality of image data captured by the camera. In some examples, the system incrementally reduces dimming of the mirror reflective element until determination that the quality of captured image data is suitable for the DMS and/or OMS function.

Optionally, when the system detects glare light at the mirror reflective element 14 and/or when the mirror reflective element is dimmed, the system may operate the light emitter to increase an intensity of the near IR light emitted by the light emitter that passes through the mirror reflective element.

Figure 4:
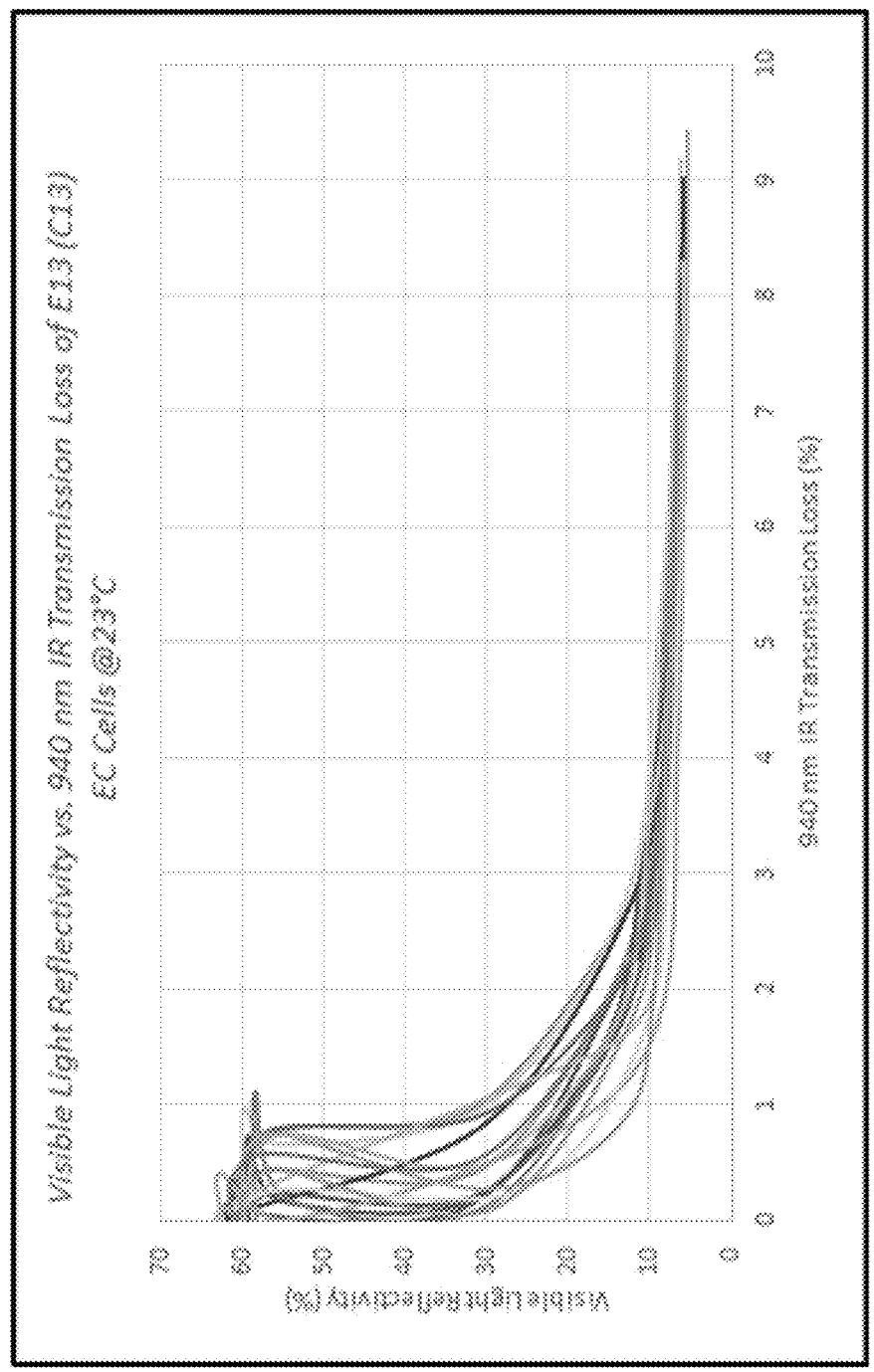
FIG. 4 is a diagram depicting visible light reflectivity in relation to near infrared light transmission loss for a plurality of mirror reflective elements.
Figure 5:
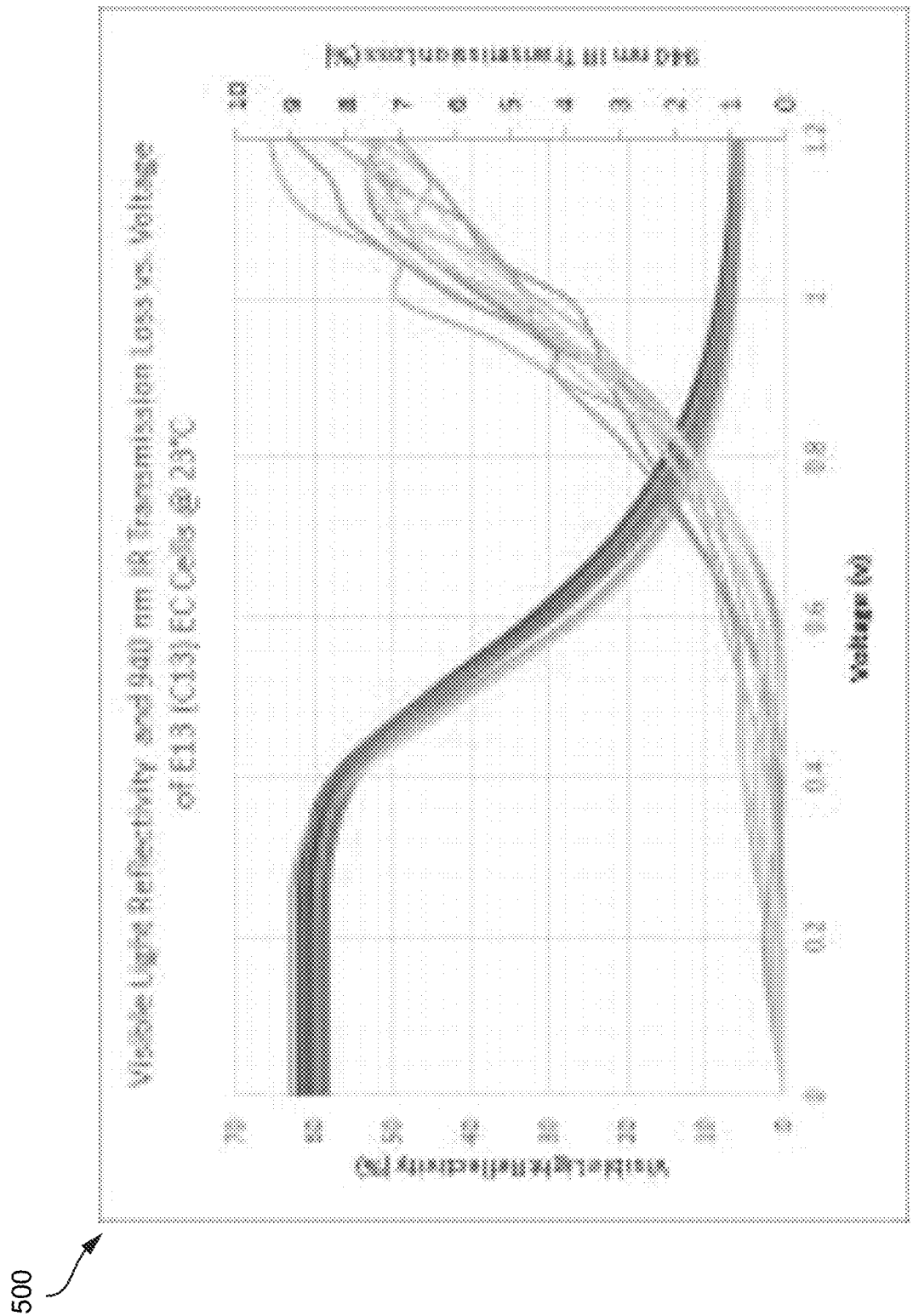
FIG. 5 is a diagram of visible light reflectivity and near infrared transmission loss versus voltage.

When dimming the mirror reflective element, and because infrared transmission loss rapidly progresses with depth of color (low-end visible reflectivity), the system may optimize depth of color to promote better near infrared transmission. As shown in FIG. 4, the near infrared transmission loss ranges from 2 percent to 9 percent between 15 percent and 7 percent reflectivity, and there is significant infrared transmission loss when the EC cell is colored or dimmed below 10 percent reflectivity. In order to safely operate within a 10 percent low-end reflectivity target, the EC cell may target a reflectivity of 7 percent±3 percent. In other words, the EC mirror reflective element may be operated with a minimum threshold level of reflectivity of between 4 percent and 10 percent to avoid the significant infrared transmission loss that occurs when the EC mirror reflective element is operated with a reflectivity below these levels. For example, and with reference to the chart 500 of FIG. 5 (which shows the visible light reflectivity of the mirror reflective element on the left y-axis, the voltage at the EC cell on the x-axis, and the near IR light transmission loss at the wavelength of 940 nanometers on the right y-axis), the EC cell may be driven at 1.2 volts to meet the reflectivity target of 7 percent±3 percent. Given a drive voltage of 1.2 volts, the mirror reflective element may average a near infrared transmission loss of around 7.5 percent. With a 15 percent low-end reflectivity target (i.e., a minimum threshold level of 15 percent reflectivity of the mirror reflective element), the EC cell may target a reflectivity of 12 percent±3 percent, and to achieve this target of 12 percent±3 percent target, the drive voltage may be backed off to approximately 0.85 volts. The average near infrared or IR transmission loss of the mirror reflective element with a drive voltage of about 0.85 volts may be 2.5 percent.

Figures 6A, 6B, 6C:
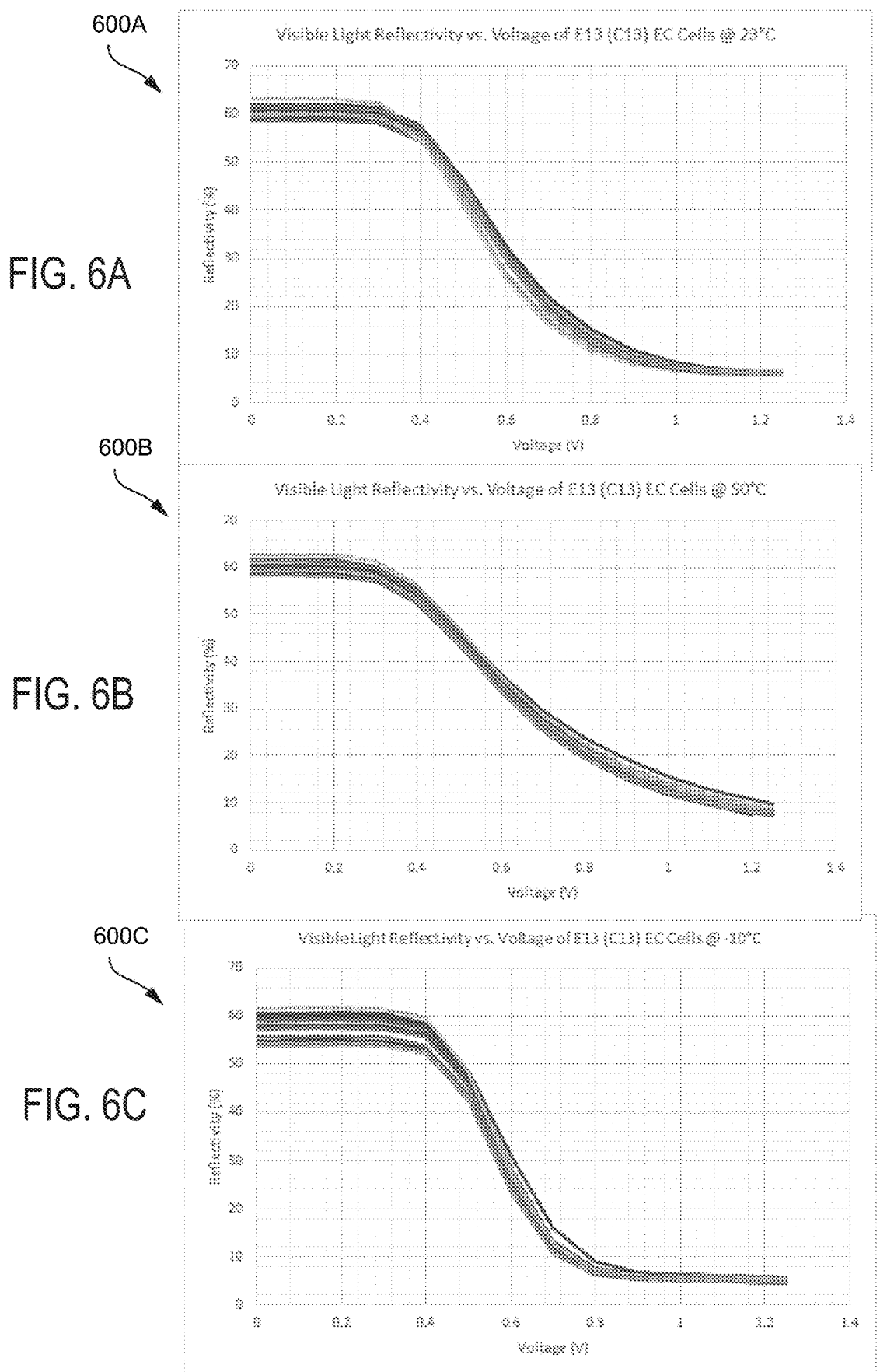
FIGS. 6A-6C are diagrams showing visible light reflectivity versus voltage for EC cells at different temperatures.

Steady state analysis simulations have shown that, due to the self-heating of the mirror during operation, the EC cell sees a temperature delta (Δ) of about 25 degrees Celsius from the ambient environment. Based on extrapolated transient analysis simulations at a constant 85 degrees Celsius, this temperature change of 25 degrees Celsius occurs in approximately 28 minutes (see the chart 600A of FIG. 6A (23 degrees Celsius), the chart 600B of FIG. 6B (50 degrees Celsius), and the chart 600C of FIG. 6C (−10 degrees Celsius), which show visible light reflectivity of the mirror reflective element on the y-axis and the voltage at the EC cell on the x-axis). When the EC cell is at 23 degrees Celsius, 15 percent reflectivity can be met when the mirror reflective element is powered at 1.0 volts, and when the EC cell is at 50 degrees Celsius, 20 percent reflectivity can be met when the mirror reflective element is powered at 1.0 volts. The depth of color may be controlled based on temperature, in order to fulfill the maximum low-end reflectivity specification and promote system performance.

In other words, because driving or controlling dimming of the EC mirror reflective element with the same voltage at different operating temperatures results in different levels of reflectivity of the mirror reflective element, the electrical power supplied to the EC mirror reflective element may be adjusted based on the temperature at the mirror reflective element (and/or an operating time of the mirror reflective element since the temperature is known to increase over time). For example, when the temperature at the mirror reflective element is relatively lower (or the EC mirror reflective element has been operating for a shorter period of time), a lower voltage may be supplied to the EC mirror reflective element than when the temperature is higher (or the operating time is greater) to achieve the same reflectivity a the mirror reflective element.

In order to optimize the mirror performance during night-time dimmed-mirror driving, the system may increase the maximum low-end reflectivity specification (i.e., a minimum threshold level of reflectivity of the mirror reflective element) from 10 percent to 15 percent. Increasing the maximum low-end reflectivity to 15 percent allows the system to operate with about 6 percent more near infrared light (i.e., about 5 percent greater transmission of near infrared light each time the near infrared light passes through the EC cell).

Figures 7A, 7B:
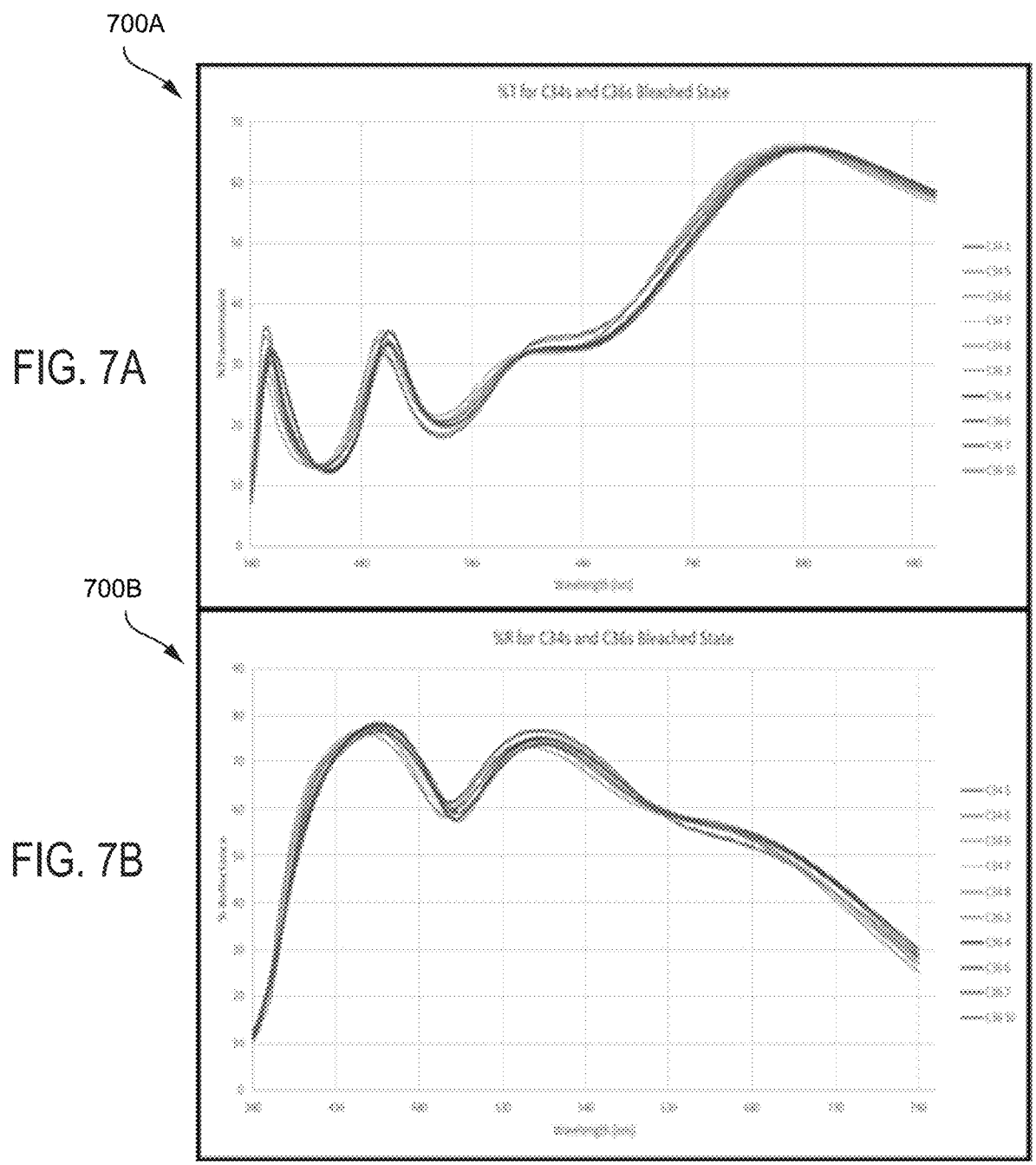
FIGS. 7A and 7B are diagrams showing transmission and reflectance of EC cells in their bleached states.

The electrochromic mirror may have high transmission in the near infrared light spectrum and significantly lower transmission in the visible light spectrum. This design allows for near infrared LEDs as well as a camera capable of sensing both visible light and near infrared light to be concealed behind the mirror glass. Some examples of electrochromic mirror performances can be seen in the chart 700A of FIG. 7A and the chart 700B of FIG. 7B, where the chart 700A shows the light transmissivity of the mirror reflective element on the y-axis and the wavelength of light incident at the mirror reflective element on the x-axis and the chart 700B shows the light reflectance of the mirror reflective element on the y-axis and the wavelength of light incident at the mirror reflective element on the x-axis.

As the electrochromic element begins to reduce the reflectance of the visible spectrum, and as the reflectance reaches a critical level of dimming (levels below 15 to 20 percent in the example), a disproportionate amount of near infrared transmission is also lost. As near infrared energy is important to the function of the driver monitoring/occupant detection/monitoring system, the transmission of near infrared light through the EC cell is also important. When the EC mirror reaches a critical level (the reflectance levels below 20 percent in this example), the near infrared transmission begins to diminish significantly (see FIG. 4).

When monitoring the vehicle compartment, the loss of near infrared transmission that occurs during dimming has a detrimental impact on the ability of the system to effectively illuminate and monitor the cabin, such as can be seen with reference to FIGS. 8A and 8B. The chart 800A of FIG. 8A and the chart 800B of FIG. 8B show ranges of illumination for the IR light emitter 22 from the mirror assembly 10, with the fore/aft distance of illumination from the mirror assembly (e.g., along the longitudinal axis of the vehicle) along the x-axis and the cross-car distance of illumination from the mirror assembly (e.g., perpendicular to the longitudinal axis of the vehicle) along the y-axis. As shown, the IR light emitter 22 may have a greater range of illumination with the mirror reflective element in a bleached or undimmed state (FIG. 8B) as compared to the dimmed state (FIG. 8A).

An additional concern occurs when the mirror glass is at colder temperatures. For example, supplying a voltage to the EC mirror reflective element may result in greater dimming when the mirror reflective element is operating at lower temperatures as compared to when the mirror reflective element is at greater temperatures. Thus, and as shown in the table 900 of FIG. 9, the system may adjust the threshold (maximum and/or minimum) levels of dimming for the mirror reflective element based on the operating temperature of the mirror reflective element. At all temperatures (e.g., including −10 degrees Celsius, 25 degrees Celsius, and 50 degrees Celsius), the minimum level of dimming may allow for reflectivity of the mirror reflective element of 55 percent or more. At colder temperatures (e.g., less than or equal to 25 degrees Celsius), the maximum level of dimming may allow for reflectivity of the mirror reflective element of 15 percent or less. At warmer temperatures (e.g., more than 25 degrees Celsius or more than 50 degrees Celsius), the maximum level of dimming may allow for reflectivity of the mirror reflective element of 20 percent or less.

The performance of EC mirrors is typically specified with the time required to transition between certain levels of reflectivity. The typical requirements vary depending on the operating temperature due to the nature of the electrochromic reaction. For example, and as shown in the table 900 of FIG. 9, the electrochromic mirror reflective element may require a response time when adjusting from a maximum reflectivity level to a 15 percent reflectivity level of 6 seconds or less when operating at −10 degrees Celsius or 23 degrees Celsius and 10 seconds or less when operating at 50 degrees Celsius. When adjusting from a minimum reflectivity level to a 50 percent reflectivity level, the electrochromic mirror reflective element may require a response time of 20 seconds or less when operating at −10 degrees Celsius and 10 seconds or less when operating at 23 degrees Celsius or 50 degrees Celsius. When adjusting from a 65 percent reflectivity level to a 35 percent reflectivity level, the electrochromic mirror reflective element may require a response time of 2 seconds or less when operating at −10 degrees Celsius or 23 degrees Celsius and a response time of 3 seconds or less when operating at 50 degrees Celsius. Accordingly, the electrochemical mirror may require slower response times to reduce reflectivity and longer response times to increase reflectivity when it is functioning in lower temperatures.

Figure 10A:
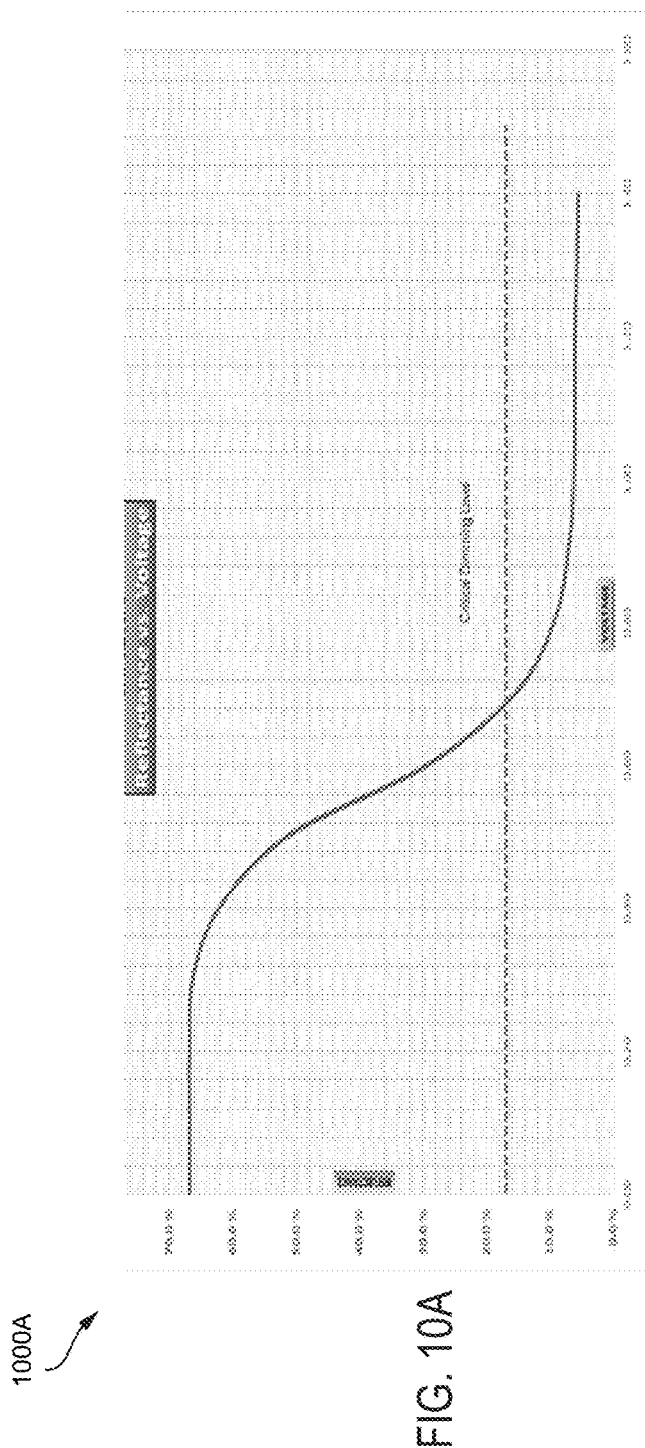
FIGS. 10A and 10B are diagrams showing reflectance versus voltage and the critical dimming level and showing a rear lux level versus forward lux level and a daylight cutoff for mirror cells with different sensitivities.
Figure 10B:
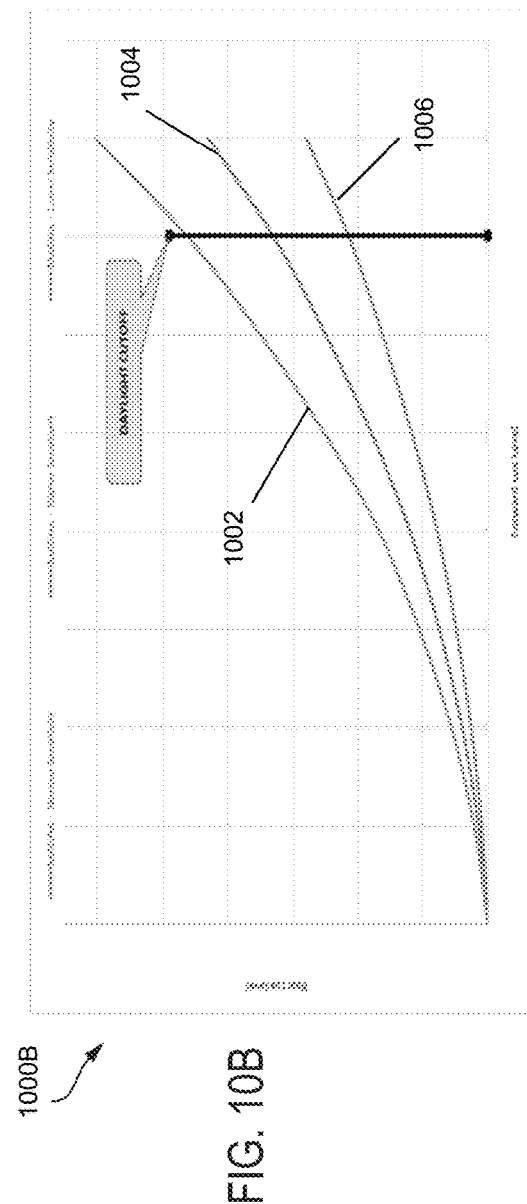

Because electrochromic response time can be slower at colder temperatures, it is desired to make provisions that reduce or limit or prevent the loss of near infrared transmission. One approach is to prevent the EC cell from coloring to depths or levels below a critical dimming level (a 15 percent reflectance level as an example) until the mirror has sufficiently warmed to a threshold temperature (e.g., to around room temperature or 18 degrees Celsius). See FIGS. 10A, 10B, and 11. The graph 1000A of FIG. 10A shows reflectance level of the mirror reflective element on the y-axis and voltage delivered to the mirror reflective element on the x-axis. The graph 1000B of FIG. 10B shows a rear lux level on the y-axis, a forward lux level on the x-axis and line 1002 tracks measurements for lower sensitivity ambient and/or glare light sensors, line 1004 tracks measurements for medium or normal sensitivity ambient and/or glare light sensors, and line 1006 tracks measurements for higher sensitivity ambient and/or glare light sensors.

Figure 11:
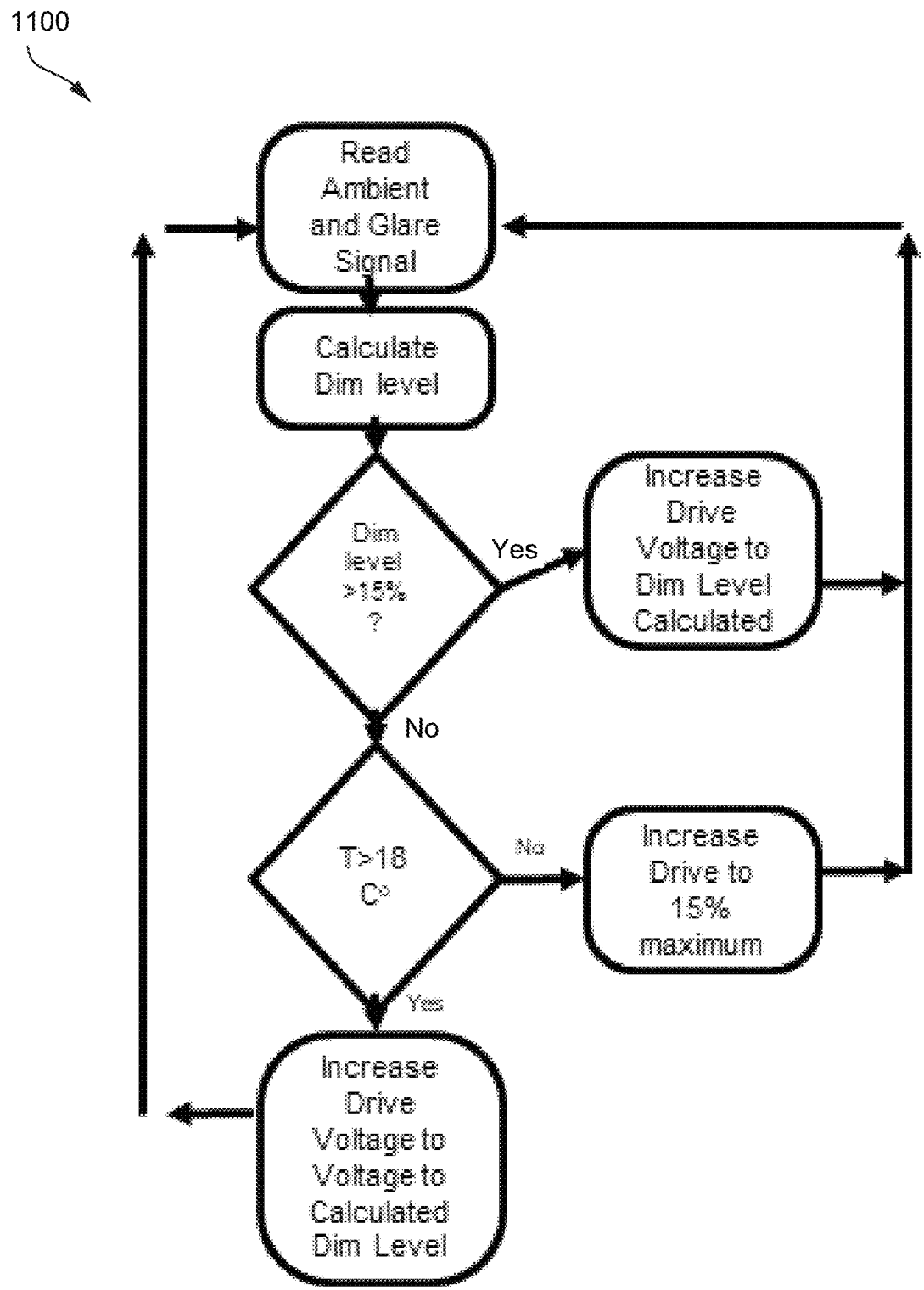
FIG. 11 is a block diagram showing an EC and DMS control process.

The method 1100 of FIG. 11 includes determining a dimming level of the mirror reflective element based on the determined ambient and/or glare light levels at the mirror reflective element. If the dimming level is calculated to have the mirror reflective element at greater than a threshold reflectance such as 15 percent reflectance, then the corresponding voltage is supplied to the EC mirror reflective element to achieve the determined dimming level. If the dimming level is calculated to have the mirror reflective element at less than or equal to the threshold reflectance (e.g., 15 percent reflectance), and the temperature at the mirror reflective element is less than or equal to a threshold temperature (e.g., less than or equal to 18 degrees Celsius), then the reflectance level of the mirror reflective element is set to a maximum reflectance of, for example, 15 percent and the corresponding voltage is supplied to the EC mirror reflective element. If the dimming level is calculated to have the mirror reflective element at less than or equal to the threshold reflectance (e.g., 15 percent reflectance), and the temperature at the mirror reflective element is greater than the threshold temperature, then the corresponding voltage is supplied to the EC mirror reflective element to achieve the calculated dimming level.

Figure 12:
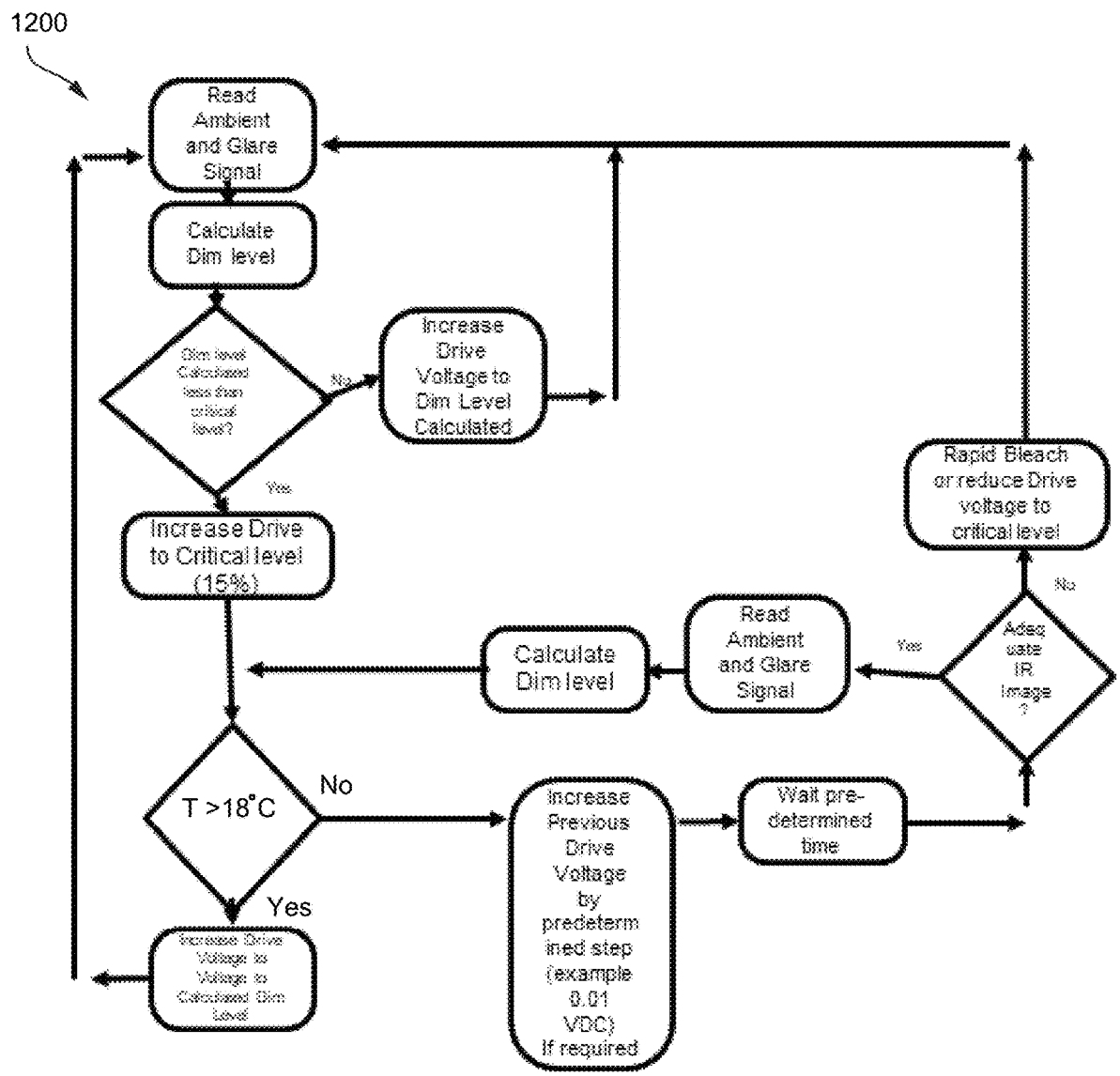
FIG. 12 is a block diagram showing another EC and DMS control process.

Another tactic can be to slow the rate at which the mirror cell dims below the critical dimming level (as shown in FIG. 10A, a reflectance level of 15 percent). By limiting the rate of dimming and monitoring the quality of the near infrared images being received, the system can self-regulate in a closed loop function and avoid dimming too deep and thus avoid impacting the integrity of the near infrared image. For example, the method 1200 of FIG. 12 includes determining a dimming level of the mirror reflective element based on the determined ambient and/or glare light levels at the mirror reflective element. If the dimming level is calculated to have the mirror reflective element at greater than a threshold reflectance, such as 15 percent reflectance (i.e., the dimming level is not less than a critical level), then the corresponding voltage is supplied to the EC mirror reflective element to achieve the determined dimming level. If the dimming is calculated to have the mirror reflective element at less than or equal to the threshold reflectance (i.e., the dimming level is less than the critical level), then the reflectance level of the mirror reflective element is set to provide the threshold reflectance and the corresponding voltage is supplied to the EC mirror reflective element. With the mirror reflective element adjusted to provide the threshold reflectance level, and if the temperature at the mirror reflective element is greater than a threshold temperature (e.g., 18 degrees Celsius), then the mirror reflective element is set to provide the determined level of dimming level and the corresponding voltage is supplied to the EC mirror reflective element. With the mirror reflective element adjusted to provide the threshold reflectance level, and if the temperature at the mirror reflective element is less than the threshold temperature, then the voltage supplied to the mirror reflective element is increased by a predetermined amount (e.g., 0.01 volts of direct current). After a predetermined amount of time (e.g., 3 seconds, 5 seconds, 10 seconds, or the like) after increasing the voltage, the system determines whether the quality of the captured image data is acceptable. If the quality of the captured image data is acceptable, the system continues determining the dimming level based on the determined ambient and/or glare light levels. If the quality of the captured image data is not acceptable, the system rapidly bleaches the mirror reflective element to increase reflectance (and thus transmission of visible and IR light) by reducing the voltage supplied to the mirror reflective element to provide at least the threshold level of reflectance. The process then repeats and continues to adjust the voltage based on temperature and quality of the captured image data.

Figure 13:
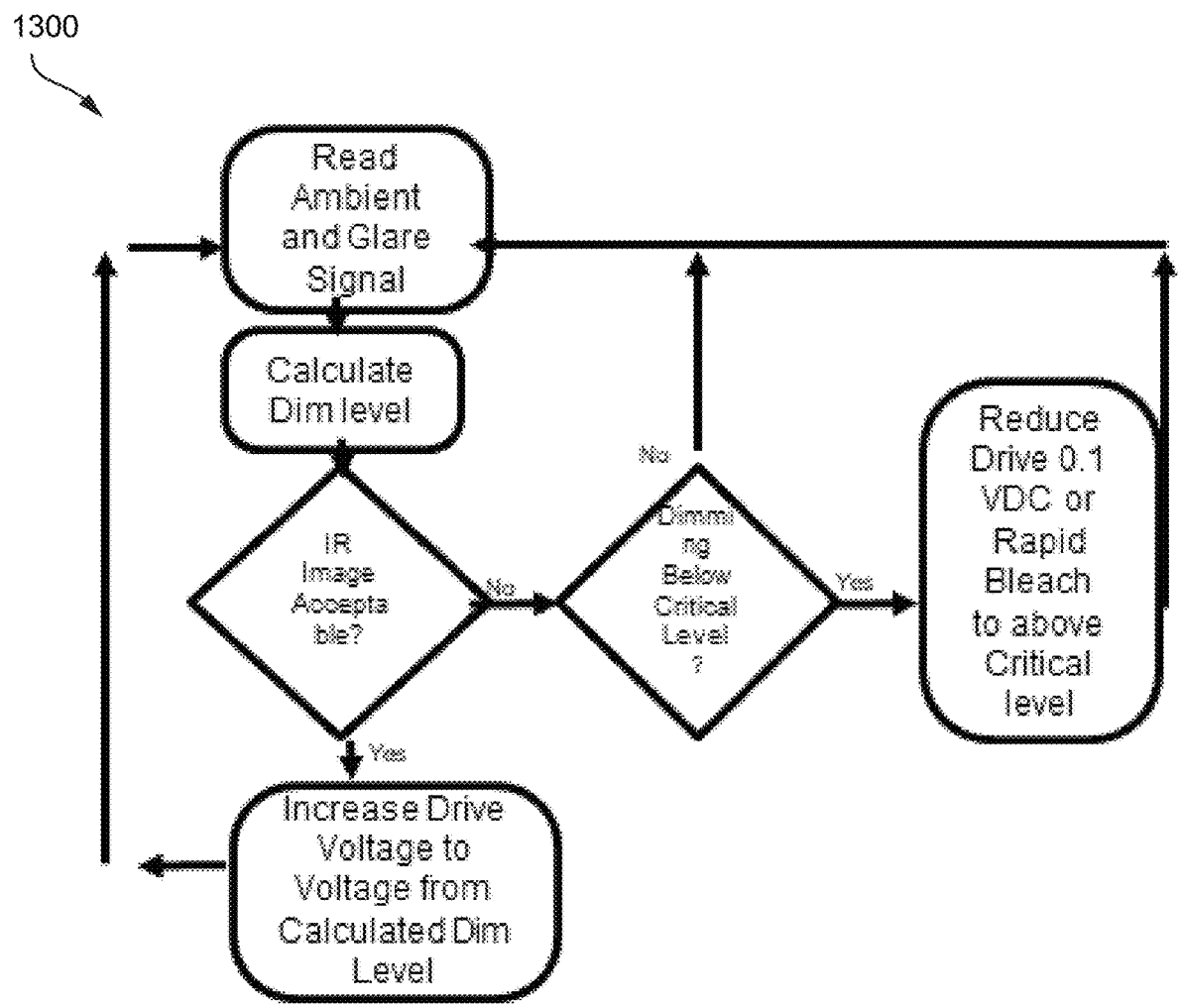
FIG. 13 is a block diagram showing an EC and DMS/OMS control process.

Because both electrochromic dimming and DMS/OMS are dynamic features, the condition of the interaction between the two systems can be continually monitored to enhance performance. In this example (see FIG. 13), the dimming is reduced (0.1 VDC steps shown as example) only when the mirror cell is below the critical dimming level providing less than the threshold level of reflectance. Alternatively, if the near infrared image is not acceptable, the dimming can be reduced regardless of dimming state level present at the time. In other words, and such as shown in the method 1300 of FIG. 13, the system determines a dimming level of the mirror reflective element based on the determined ambient and/or glare light levels at the mirror reflective element. If the quality of the image data representative of IR light captured by the camera is acceptable, then the mirror reflective element is adjusted to the determined dimming level and the corresponding voltage is supplied to the EC mirror reflective element. If the quality of the image data representative of IR light captured by the camera is not acceptable, and the reflectance of the mirror reflective element is set below a threshold level (e.g., 15 percent reflectance), then the system reduces the voltage supplied to the EC mirror reflective element by a predetermined amount (e.g., 0.1 volts of direct current) and/or performs a rapid bleach of the mirror reflective element to increase reflectance (and thus transmission of visible and IR light) by reducing the voltage supplied to the mirror reflective element to provide at least the threshold level of reflectance. If the quality of the image data representative of IR light captured by the camera is not acceptable, and the reflectance of the mirror reflective element is above the threshold level, then the system may not adjust the reflectance of the mirror reflective element.

The dimming response time of the electrochromic cell generally correlates to the difference in voltage potential. Electrochromic cells can also have different response times based on how long they have been powered at a given voltage (due to a known condition commonly referring to as saturation). In order to drive an increased speed of change—changes to the coloring algorithm may enhance the system performance. The EC dimming circuit utilizes a pulse-width modulation (PWM) control technique to effectively vary the dimming voltage to the mirror. This approach modifies the PWM only slightly in order to change the dimming dynamically. This approach can lead to relatively small difference in drive potential and correspondingly the mirror may not adapt to the new settings as quickly. The speed of response can be further slowed by the saturation condition noted earlier.

This condition can be counteracted by allowing the EC cell to be short circuited for a variable period of time calculated based on the operating conditions experienced. These conditions can include time under power, level of power and EC cell temperature. Alternatively, the EC cell can be driven to lower voltages (including zero) to effect a more rapid bleach. Alternatively, the EC cell can be exposed to variable levels of reverse polarity for a variable period of time calculated similar to the above. Further, the electrochromic mirror dimming control system can be arranged to limit saturation by managing the PWM or other voltage drive solutions in a manner that reduces saturation. Additional adjustments can be made with the electrochromic materials to improve response time as well as reduce saturation. This can include items such as augmenting compounds (to augment the electron flow), electrochromic material concentration, electrochromic cell gap and other features.

Figure 14:
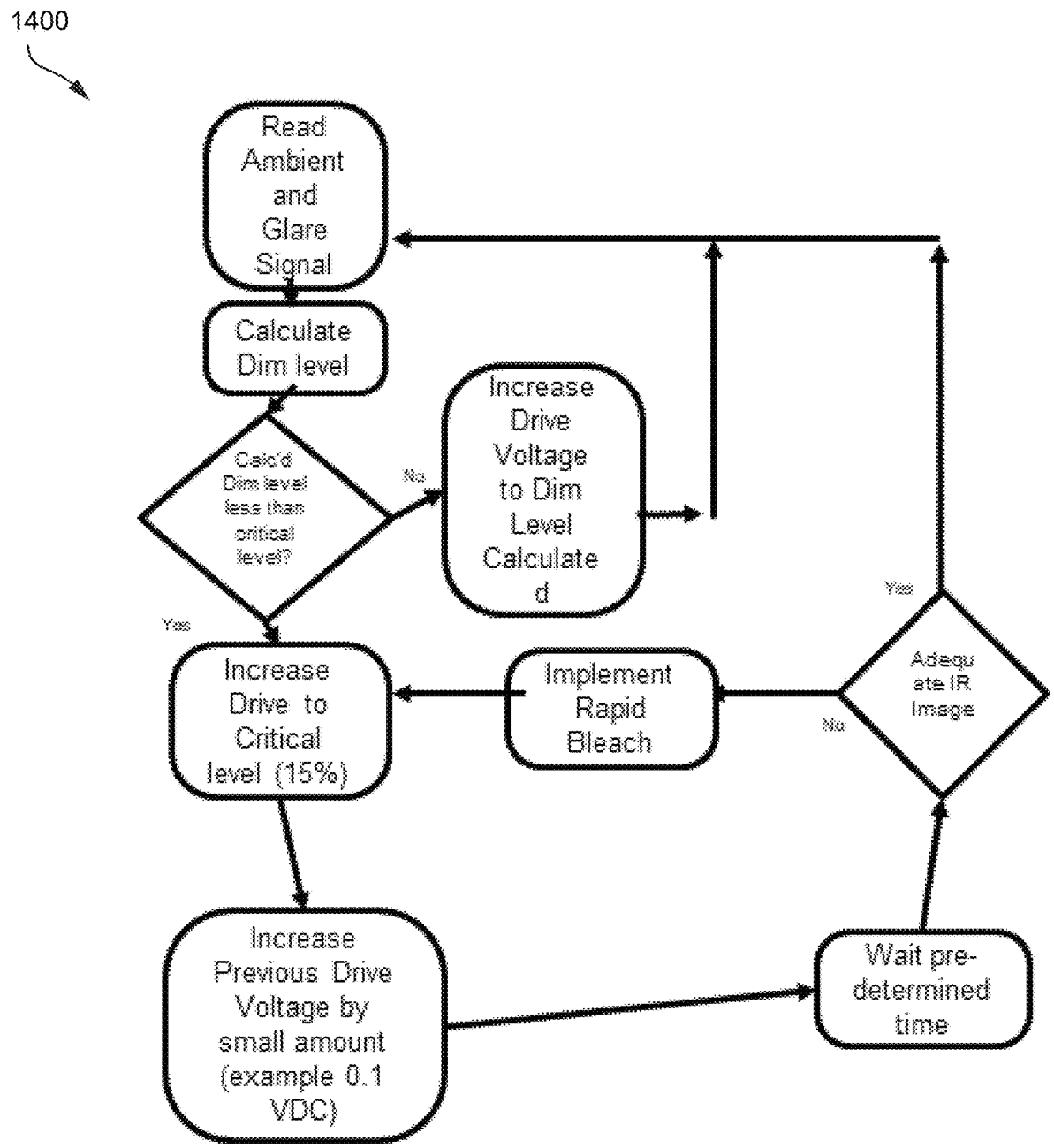
FIG. 14 is a block diagram showing another EC and DMS control process.

Because electrochromic response time can be much slower than the electronic systems at all temperatures, provisions must be made to prevent the loss of near infrared transmission. An effective strategy can be to slow the rate at which the mirror dims below the critical dimming level (e.g., where the mirror reflective element provides a reflectance level of 15 percent or less). By limiting the rate of dimming and monitoring the quality of the near infrared images being received, the system can self-regulate in a closed loop function and avoid dimming too deep and thus avoid impacting the integrity of the near infrared image. For example, and as shown in the method 1400 of FIG. 14, the system determines a dimming level of the mirror reflective element based on the determined ambient and/or glare light levels at the mirror reflective element. If the dimming level is calculated to have the mirror reflective element at a reflectance level greater than the critical or threshold level (e.g., 15 percent reflectance), then the corresponding voltage is supplied to the EC mirror reflective element to achieve the determined dimming level. If the dimming level is calculated to have the mirror reflective element at a reflectance level less than or equal to the critical or threshold level, then the dimming is set to provide the threshold reflectance level and the corresponding voltage is supplied to the EC mirror reflective element. With the dimming set to provide the threshold reflectance level, the voltage supplied to the mirror reflective element is increased by a predetermined amount (e.g., 0.1 volts of direct current). After a predetermined amount of time (e.g., 3 seconds, 5 seconds, 10 seconds, or the like) after increasing the voltage, the system determines whether the quality of the captured image data is acceptable. If the quality of the captured image data is acceptable, the system continues determining the dimming level based on the determined ambient and/or glare light levels. If the quality of the captured image data is not acceptable, the system rapidly bleaches the mirror reflective element to increase reflectance (and thus transmission of visible and IR light) by reducing the voltage supplied to the mirror reflective element to provide at least the threshold level of reflectance.

In order to optimize the DMS/OMS system, a closed loop system is used to balance the intensity of the illumination and the camera parameters are used. Some of these system control parameters can include camera exposure time and LED drive power. A "Guard Band" can be created for these parameters in order to determine when the DMS/OMS system is approaching a risk point for inadequate image quality. By monitoring the proximity of the system control parameters to the "Guard Band", the EC dimming function can be dynamically adapted to avoid putting the system at risk due to near infrared loss associated with driving the EC dimming levels below the critical levels for near infrared transmission.

Furthermore, because the mirror assembly 10 is at least partially angled or titled toward the driver when providing the field of view rearward of the vehicle to the driver, visibility of the passenger seat for the DMS or OMS camera may not be as clear as the visibility of the driver seat. That is, because the DMS and OMS camera may face in the same direction as the mirror reflective element 14 (i.e., the DMS and OMS camera is angled or canted partially toward the driver of the vehicle when the mirror reflective element is set to provide the rearward view for the driver), the DMS and OMS camera may be at least partially angled or titled toward the driver seat and thus the passenger seat may be positioned at an edge or partially outside of the field of view of the camera. This limitation may be problematic for achieving passenger monitoring functions.

Thus, the actuator of the mirror assembly, such as the actuator providing the memory position function, may be used to adjust the position of the mirror head relative to the mounting structure 16 so that the DMS/OMS camera may also view the passenger position in the vehicle cabin. For example, upon vehicle shut off, the memory position function may adjust the position of the mirror head to a default and centered position, where a field of view of the DMS/OMS camera accommodated by the mirror head is generally aligned with a longitudinal axis of the vehicle. Thus, upon vehicle startup, the mirror head may be in a position where the camera may view the passenger position and determine whether a passenger is present in the vehicle (such as to determine whether to limit dimming of the mirror reflective element).

Optionally, the default position of the mirror head may angle or tilt the mirror head at least partially toward the passenger seat. Upon vehicle startup, the memory position actuator may move the mirror head toward the stored memory position for the driver (where the mirror head is at least partially angled or tilted toward the driver side of the vehicle) and, as the mirror head moves toward the stored position, the camera scans the vehicle to determine presence of passengers and/or provide other occupant monitoring functions.

Optionally, if during operation of the vehicle (i.e., the mirror head is at least partially angled or titled toward the driver of the vehicle) the DMS or OMS determines that a passenger is at or near an edge of the field of view of the camera, the system may operate the actuator to slightly adjust positioning of the mirror so that the passenger is more within the field of view of the camera. Thus, the actuator may be operated to improve the field of view of the camera (i.e., bring the passenger nearer or into the field of view of the camera) via minor or incremental movements that do not greatly affect the rearward view provided to the driver via the mirror reflective element. Because the overall width of the rearward view provided by the interior rearview mirror is typically wider than the view through the rear window of the vehicle provided by the interior rearview mirror, a slight adjustment of the mirror head toward the center of the vehicle or passenger side of the vehicle will still provide a full view of the rear window (and through the rear window) to the driver of the vehicle.

That is, the mirror may include an actuator that may automatically cause the mirror to move to default to a position where the camera is aimed at the passenger seat and scan the vehicle using the actuator upon vehicle startup or at other times that information regarding the passenger is desired. By incorporating a memory mirror and memory seats, calculations may be performed to automatically adjust the mirror position slightly to obtain a more ideal perspective of the passenger.

During operation, the driver monitoring system can locate the driver and monitor the driver's condition, and may also identify the driver. Because the DMS already works to determine the driver's location, such location information can be used in conjunction with the mirror actuator to automatically adjust the mirror head position.

Furthermore, this data, along with other inputs, may allow for automatic adjustment of the exterior rearview mirrors to position them so as to provide the driver's rearward and sideward view. Some of the inputs that may be used in this application include facial recognition, driver position relative to the driver monitoring camera (and relative to the interior mirror), seat location, and the like. For example, facial recognition features within the DMS can be used to replace the current memory select features that are often based on a keyfob or user input in the vehicle.

Figure 15:
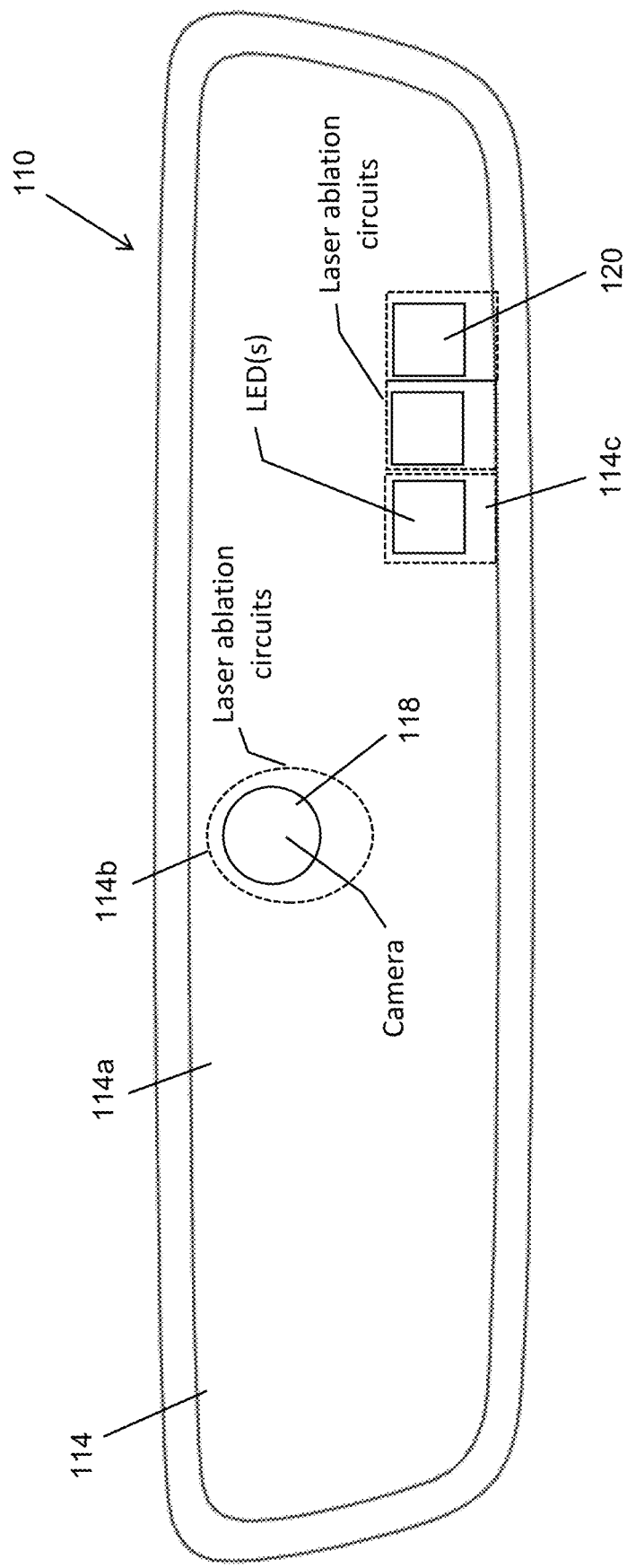
FIG. 15 is a view of a variable reflectance mirror reflective element having separately dimmed regions at the camera and at the light emitters.

Optionally, the electro-optic (e.g., electrochromic) mirror reflective element may have individually dimmed regions at a principal viewing region and at the camera and/or light emitter(s), whereby the regions of the reflective element can be selectively dimmed or darkened (or not dimmed or darkened) to enhance DMS performance when the principal viewing region of the mirror reflective element is dimmed (such as responsive to detection of glare light incident at the mirror reflective element). For example, and such as shown in FIG. 15, the electrically conductive coatings or films at the glass substrates and in contact with the electrochromic medium may have electrically isolated regions (such as formed via laser ablation of the electrically conductive coatings or films and separately powering the separate regions) at the camera and at the light emitters. That is, the mirror assembly 110 includes a mirror reflective element 114 that includes a first or primary viewing region 114a that may span a large portion of the viewing area of the mirror reflective element (e.g., 75 percent or more of the viewing area) so that adjusting the dimming level of the primary viewing region 114a adjusts the level of reflectance at the primary viewing region 114a and thus adjusts dimming of reflections at the mirror reflective element 114 viewed by the driver. The mirror reflective element 114 further includes a second or camera viewing region 114b that corresponds to the position of the camera 118 behind the mirror reflective element 114 so that the camera 118 views through the camera viewing region 114b and adjusting dimming of the camera viewing region 114b adjusts transmission of visible light and near IR light through the camera viewing region 114b and viewed by the camera 118. One or more third or LED viewing regions 114c of the mirror reflective element 114 correspond to the respective positions of the light emitters 120 disposed behind the mirror reflective element 114 and emitting light through the LED viewing region 114c so that dimming of the LED viewing region 114c adjusts transmission of light through the LED viewing region 114c to illuminate at least a portion of the vehicle cabin. Thus, the principal reflecting region 114a of the mirror reflective element (e.g., the mirror reflective element except at the camera and light emitters) may be independently dimmed to reduce glare to the driver, and the camera region 114b and the light emitter region(s) 114c may not be dimmed (or dimmed less) to provide enhanced light transmissivity through the reflective element at those regions. The regions may be formed by isolation lines ablated through the electrically conductive coatings at the glass substrates and powered utilizing aspects of the mirror reflective elements described in U.S. Pat. No. 7,626,749 and/or U.S. Publication No. US-2011-0273659, which are hereby incorporated herein by reference in their entireties.

By selectively dividing and separating the electrically conductive surfaces with very thin laser ablation circuits or deletion lines or electrically isolating lines, the mirror can be selectively dimmed to allow the light emitters, camera, etc. to have different levels of dimming to enhance DMS performance due to near infrared and visible spectrum transmission through the mirror reflective element. Select areas or regions (e.g., at the camera and/or at the light emitters) can have limited dimming or increased dimming in order to tailor an auto dimming mirror containing cameras, displays and/or light emitters to specific optical conditions. Thus, either the main or principle viewing/reflecting area or the camera region or the light emitter region may be dimmed while the other is un-dimmed or unpowered, in order to provide the desired reflectivity and viewability of the reflective element and desired performance of the camera and/or light emitters of the DMS, depending on the particular application and desired function of the reflective element assembly.

Thus, for example, the system may, responsive to a glare light sensor, dim or darken the principal viewing region of the reflective element, while not darkening or dimming (or darkening or dimming to a lesser degree as compared to the principal viewing region) the camera region and light emitter region so that more light emitted by the light emitters (when electrically powered to emit light) passes through the less-dimmed light emitter region of the mirror reflective element and more light passes through the less dimmed camera region to be received at the camera. Thus, the system provides for enhanced driver monitoring and/or occupant monitoring, even when the mirror reflective element is dimmed to reduce glare to the driver of the vehicle.

Optionally, the individually dimmed regions of the mirror reflective element may be selectively dimmed or darkened to a different degree than the principal viewing region in response to operation of the DMS camera and/or light emitters, and the individually dimmed regions may be dimmed or darkened equally with the principal viewing region when the DMS camera and/or light emitters are not operating. Thus, the individually dimmed regions may be individually operated (i.e., dimmed or not dimmed) when the DMS is operating and the individually dimmed regions may operate according to operation of the principal viewing region when the DMS is not operating.

Optionally, the camera may be used to detect glare light (such as by utilizing aspects of the cameras and systems described in U.S. Pat. Nos. 11,242,008; 10,967,796 and/or 10,948,798, and/or International Publication No. WO 2022/150826, which are all hereby incorporated herein by reference in their entireties), and the camera region of the mirror reflective element may not be dimmed or darkened during periods where the camera is operating to capture image data for processing to determine glare light. In other words, the camera region may be in its non-darkened (not powered) state when the system operates to detect glare light rearward of the vehicle, and may be dimmed or darkened as discussed above (either individually or with one or more other regions of the reflective element) when not operating to detect glare light.

Optionally, the mirror assembly may include one or more other displays, such as the types disclosed in U.S. Pat. Nos. 5,530,240 and/or 6,329,925, which are hereby incorporated herein by reference in their entireties, and/or display-on-demand transflective type displays, and/or video displays or display screens, such as the types disclosed in U.S. Pat. Nos. 8,890,955; 7,855,755; 7,626,749; 7,338,177; 7,274,501; 7,255,451; 7,195,381; 7,184,190; 7,046,448; 5,668,663; 5,724,187; 5,530,240; 6,329,925; 6,690,268; 7,734,392; 7,370,983; 6,902,284; 6,428,172; 6,420,975; 5,416,313; 5,285,060; 5,193,029 and/or 4,793,690, and/or in U.S. Pat. Pub. Nos. US-2006-0050018; US-2009-0015736; US-2009-0015736; US-2010-0097469 and/or US-2011-0273659, which are all hereby incorporated herein by reference in their entireties.

The video display screen may be controlled or operable in response to an input or signal, such as a signal received from one or more cameras or image sensors of the vehicle, such as a video camera or sensor, such as a CMOS imaging array sensor, a CCD sensor or the like, and image processors or image processing techniques, such as utilizing aspects of the cameras and image processors described U.S. Pat. Nos. 5,550,677; 5,670,935; 5,760,962; 6,498,620; 6,396,397; 6,222,447; 6,201,642; 6,097,023; 5,877,897; 5,796,094; 5,715,093; 6,922,292; 6,757,109; 6,717,610; 6,590,719; 6,320,176; 6,559,435; 6,831,261; 6,806,452; 6,822,563; 6,946,978; 7,038,577; 7,004,606 and/or 7,720,580, and/or U.S. Pat. Pub. Nos. US-2006-0171704; US-2009-0244361 and/or US-2010-0214791, and/or International Publication Nos. WO 2009/046268 and/or WO 2009/036176, which are all hereby incorporated herein by reference in their entireties, or from one or more imaging systems of the vehicle, such as a reverse or backup aid system, such as a rearwardly directed vehicle vision system utilizing principles disclosed in U.S. Pat. Nos. 5,550,677; 5,760,962; 5,670,935; 6,201,642; 6,396,397; 6,498,620; 6,717,610 and/or 6,757,109, which are hereby incorporated herein by reference in their entireties, a trailer hitching aid or tow check system, such as the type disclosed in U.S. Pat. No. 7,005,974, which is hereby incorporated herein by reference in its entirety, a cabin viewing or monitoring device or system, such as a baby viewing or rear seat viewing camera or device or system or the like, such as disclosed in U.S. Pat. Nos. 5,877,897 and/or 6,690,268, which are hereby incorporated herein by reference in their entireties, a video communication device or system, such as disclosed in U.S. Pat. No. 6,690,268, which is hereby incorporated herein by reference in its entirety, and/or the like. The imaging sensor or camera may be activated and the display screen may be activated in response to the vehicle shifting into reverse, such that the display screen is viewable by the driver and is displaying an image of the rearward scene while the driver is reversing the vehicle. It is envisioned that an image processor or controller (such as an EYEQ™ image processing chip available from Mobileye Vision Technologies Ltd. of Jerusalem, Israel, and such as an image processor of the types described in U.S. Pat. No. 9,126,525, which is hereby incorporated herein by reference in its entirety) may process image data captured by the rearward facing camera to assess glare lighting conditions (such as to detect headlights of following vehicles that may cause glare at the interior and/or exterior rearview mirror assemblies of the equipped vehicle), and the controller may adjust or control the dimming of the electro-optic mirror assembly or assemblies of the equipped vehicle responsive to such image processing.

The mirror assembly may include a camera or sensor or light of a driver monitoring system and/or head and face direction and position tracking system and/or eye tracking system and/or gesture recognition system. Such head and face direction and/or position tracking systems and/or eye tracking systems and/or gesture recognition systems may utilize aspects of the systems described in U.S. Pat. Nos. 11,518,401; 10,958,830; 10,065,574; 10,017,114; 9,405,120 and/or 7,914,187, and/or U.S. Publication Nos. US-2022-0377219; US-2022-0254132; US-2022-0242438; US-2021-0323473; US-2021-0291739; US-2020-0320320; US-2020-0202151; US-2020-0143560; US-2019-0210615; US-2018-0231976; US-2018-0222414; US-2017-0274906; US-2017-0217367; US-2016-0209647; US-2016-0137126; US-2015-0352953; US-2015-0296135; US-2015-0294169; US-2015-0232030; US-2015-0092042; US-2015-0022664; US-2015-0015710; US-2015-0009010 and/or US-2014-0336876, and/or International Publication Nos. WO 2023/034956; WO 2022/241423 and/or WO 2022/187805, and/or PCT Application No. PCT/US2023/021799, filed May 11, 2023, which are all hereby incorporated herein by reference in their entireties.

Optionally, the driver monitoring system may be integrated with a camera monitoring system (CMS) of the vehicle. The integrated vehicle system incorporates multiple inputs, such as from the inward viewing or driver monitoring camera and from the forward or outward viewing camera, as well as from a rearward viewing camera and sideward viewing cameras of the CMS, to provide the driver with unique collision mitigation capabilities based on full vehicle environment and driver awareness state. The image processing and detections and determinations are performed locally within the interior rearview mirror assembly and/or the overhead console region, depending on available space and electrical connections for the particular vehicle application. The CMS cameras and system may utilize aspects of the systems described in U.S. Pat. No. 11,242,008 and/or U.S. Publication Nos. US-2021-0162926; US-2021-0155167; US-2018-0134217 and/or US-2014-0285666, and/or International Publication No. WO 2022/150826, which are all hereby incorporated herein by reference in their entireties.

Optionally, the DMS camera may be used to detect ambient light and/or glare light (emanating from headlamps of a trailing vehicle) for use in providing auto-dimming of the EC mirror reflective element. The DMS camera may be disposed in the mirror head and viewing rearward through the mirror reflective element. The processing of image data captured by the DMS camera may be adjusted to accommodate the angle of the mirror head so that the ECU or system, via image processing of image data captured by the DMS camera, determines headlamps of a trailing vehicle (behind the equipped vehicle and traveling in the same direction as the equipped vehicle and traveling in the same traffic lane or in an adjacent traffic lane) to determine glare light at the mirror reflective element. The processing of image data captured by the DMS camera is adjusted to accommodate the degree of dimming of the mirror reflective element. For example, the system knows how much the mirror reflective element is dimmed (responsive to the determined glare light intensity and location) and can accommodate for the mirror dimming level when processing captured image data to determine presence and intensity of light sources/headlamps rearward of the vehicle. The intelligent/automatic mirror dimming functions may utilize aspects of the systems described in U.S. Pat. Nos. 11,242,008; 10,967,796 and/or 10,948,798, and/or International Publication No. WO 2022/150826, which are all hereby incorporated herein by reference in their entireties.

Changes and modifications in the specifically described embodiments may be carried out without departing from the principles of the present invention, which is intended to be limited only by the scope of the appended claims as interpreted according to the principles of patent law.

The invention claimed is:

1. A vehicular occupant monitoring system, the vehicular occupant monitoring system comprising:
   a vehicular interior rearview mirror assembly configured to attach at an interior portion of a vehicle equipped with the vehicular occupant monitoring system, wherein the vehicular interior rearview mirror assembly comprises a mirror head adjustable about a mounting structure;
   wherein the mirror head accommodates a variable reflectance mirror reflective element;
   a camera accommodated by the mirror head and operable to capture image data, wherein the camera views through the variable reflectance mirror reflective element;
   an electronic control unit (ECU) comprising electronic circuitry and associated software, wherein the electronic circuitry comprises an image processor for processing image data captured by the camera;
   a light emitter accommodated by the mirror head and electrically operable to emit near infrared (NIR) light, and wherein NIR light emitted by the light emitter passes through the variable reflectance mirror reflective element to illuminate at least a driver region and a front passenger region of an interior cabin of the vehicle;
   wherein, with the vehicular interior rearview mirror assembly attached at the interior portion of the vehicle, and when the light emitter is electrically operated to emit NIR light, the camera captures image data representative of NIR light reflected from within the interior cabin of the vehicle that passes through the variable reflectance mirror reflective element;
   wherein, responsive to detection at the variable reflectance mirror reflective element of glare light emanating from a rear approaching vehicle during nighttime driving, the reflectance of the variable reflectance mirror reflective element is electrically reduced;
   wherein, with the vehicular interior rearview mirror assembly attached at the interior portion of the vehicle, and with the mirror head adjusted relative to the mounting structure to provide a rearward field of view to a driver of the vehicle, the camera views the driver region and the front passenger region of an interior cabin of the vehicle;
   wherein the vehicular occupant monitoring system, based on processing at the ECU of image data captured by the camera, determines presence of a passenger at the front passenger region of the interior cabin of the vehicle; and
   wherein the vehicular occupant monitoring system, responsive to determining presence of the passenger at the front passenger region of the interior cabin of the vehicle, limits electrical reduction of the reflectance of the variable reflectance mirror reflective element to provide at least a first minimum threshold transmission level of NIR light passing through the variable reflectance mirror reflective element.

2. The vehicular occupant monitoring system of claim 1, wherein the vehicular occupant monitoring system, responsive to determining that a passenger is not present at the front passenger region of the interior cabin of the vehicle, does not limit electrical reduction of the reflectance of the variable reflectance mirror reflective element.

3. The vehicular occupant monitoring system of claim 1, wherein the vehicular occupant monitoring system, responsive to determining that a passenger is not present at the front passenger region of the interior cabin of the vehicle, limits electrical reduction of the reflectance of the variable reflectance mirror reflective element so that the variable reflectance mirror reflective element provides at least a second minimum threshold transmission level of NIR light that is less than the first minimum threshold transmission level.

4. The vehicular occupant monitoring system of claim 1, wherein the vehicular interior rearview mirror assembly further comprises an actuator that is electrically operable to adjust the mirror head relative to the mounting structure to adjust the rearward view of the driver of the vehicle.

5. The vehicular occupant monitoring system of claim 4, wherein the camera moves in tandem with the mirror head when, with the vehicular interior rearview mirror assembly attached at the interior portion of the vehicle, the mirror head is adjusted relative to the mounting structure.

6. The vehicular occupant monitoring system of claim 5, wherein the vehicular occupant monitoring system, responsive to determining presence of the passenger at the front passenger region of the interior cabin of the vehicle, electrically operates the actuator to move the mirror head relative to the mounting structure so that the camera at least partially views the front passenger region of the vehicle.

7. The vehicular occupant monitoring system of claim 1, wherein the vehicular occupant monitoring system, responsive to determining presence of the passenger at the front passenger region of the interior cabin of the vehicle, adjusts operation of the light emitter to increase an intensity of NIR light emitted by the light emitter.

8. The vehicular occupant monitoring system of claim 1, wherein, responsive to determining presence of the passenger at the front passenger region of the interior cabin of the vehicle, the vehicular occupant monitoring system, based on processing at the ECU of image data captured by the camera, monitors the passenger.

9. The vehicular occupant monitoring system of claim 8, wherein, when the variable reflectance mirror reflective element provides less than the first minimum threshold transmission level of NIR light passing through the variable reflectance mirror reflective element, image data captured by the camera is not suitable for monitoring the passenger, and wherein, when the variable reflectance mirror reflective element provides at least the first minimum threshold transmission level of NIR light passing through the variable reflectance mirror reflective element, image data captured by the camera is suitable for monitoring the passenger.

10. The vehicular occupant monitoring system of claim 9, wherein the vehicular occupant monitoring system, based on processing of image data captured by the camera, adjusts limits on the electrical reduction of the reflectance of the variable reflectance mirror reflective element so that image data captured by the camera is suitable for monitoring the passenger.

11. The vehicular occupant monitoring system of claim 1, wherein the variable reflectance mirror reflective element comprises (i) a principal viewing region, (ii) a camera region and (iii) a light emitter region, and wherein reflectance of the variable reflectance mirror reflective element at the principal viewing region is adjusted separate from reflectance of the variable reflectance mirror reflective element at the camera region and the light emitter region.

12. The vehicular occupant monitoring system of claim 11, wherein the vehicular occupant monitoring system electrically reduces reflectance of the variable reflectance mirror reflective element at the principal viewing region and limits electrical reduction of the reflectance of the variable reflectance mirror reflective element at the camera region and at the light emitter region so that the variable reflectance mirror reflective element provides at least the first minimum threshold transmission level of NIR light passing through the variable reflectance mirror reflective element at the camera region and at the light emitter region.

13. The vehicular occupant monitoring system of claim 11, wherein the camera region and the light emitter region are established via electrically isolating deletion lines through electrically conductive films of the variable reflectance mirror reflective element.

14. The vehicular occupant monitoring system of claim 1, wherein the vehicular occupant monitoring system sets a minimum threshold level of reflectance of the variable reflectance mirror reflective element to limit electrical reduction of the reflectance of the variable reflectance mirror reflective element.

15. The vehicular occupant monitoring system of claim 1, wherein the vehicular occupant monitoring system sets a maximum threshold level of electrical current applied to the variable reflectance mirror reflective element to limit electrical reduction of the reflectance of the variable reflectance mirror reflective element.

16. The vehicular occupant monitoring system of claim 1, wherein the vehicular occupant monitoring system adjusts limits on the electrical reduction of the reflectance of the variable reflectance mirror reflective element based on a temperature at the variable reflectance mirror reflective element.

17. The vehicular occupant monitoring system of claim 16, wherein, based on the temperature at the variable reflectance mirror reflective element being less than a threshold temperature, reflectance of the variable reflectance mirror reflective element is adjustable based on a first minimum threshold level of reflectance, and wherein, based on the temperature at the variable reflectance mirror reflective element being greater than the threshold temperature, reflectance of the variable reflectance mirror reflective element is adjustable based on a second minimum threshold level of reflectance, and wherein the second minimum threshold level of reflectance is less than the first minimum threshold level of reflectance.

18. The vehicular occupant monitoring system of claim 1, wherein the vehicular occupant monitoring system, based on processing at the ECU of image data captured by the camera, monitors the driver present in the interior cabin of the vehicle.

19. The vehicular occupant monitoring system of claim 1, wherein the vehicular occupant monitoring system, based on processing of image data captured by the camera, adjusts limits on the electrical reduction of the reflectance of the variable reflectance mirror reflective element so that image data captured by the camera is suitable for at least one selected from the group consisting of (i) a driver monitoring function and (ii) an occupant monitoring function.

20. The vehicular occupant monitoring system of claim 1, wherein the ECU is disposed within the mirror head.

21. The vehicular occupant monitoring system of claim 1, wherein the ECU is disposed at the vehicle remote from the mirror head.

22. The vehicular occupant monitoring system of claim 1, wherein the interior portion is an in-cabin side of a windshield of the vehicle.

23. A vehicular driver monitoring system, the vehicular driver monitoring system comprising:
   a vehicular interior rearview mirror assembly configured to attach at an interior portion of a vehicle equipped with the vehicular driver monitoring system, wherein the vehicular interior rearview mirror assembly comprises a mirror head adjustable about a mounting structure;
   wherein the mirror head accommodates a variable reflectance mirror reflective element;
   a camera accommodated by the mirror head and operable to capture image data, wherein the camera views through the variable reflectance mirror reflective element;
   an electronic control unit (ECU) comprising electronic circuitry and associated software, wherein the electronic circuitry comprises an image processor for processing image data captured by the camera;
   wherein the vehicular driver monitoring system, based on processing at the ECU of image data captured by the camera, monitors a driver present in an interior cabin of the vehicle;
   a light emitter accommodated by the mirror head and electrically operable to emit near infrared (NIR) light, and wherein NIR light emitted by the light emitter passes through the variable reflectance mirror reflective element to illuminate at least a driver region of an interior cabin of the vehicle;

wherein, with the vehicular interior rearview mirror assembly attached at the interior portion of the vehicle, and when the light emitter is electrically operated to emit NIR light, the camera captures image data representative of NIR light reflected from objects within the interior cabin of the vehicle that passes through the variable reflectance mirror reflective element;

wherein, responsive to detection at the variable reflectance mirror reflective element of glare light emanating from a rear approaching vehicle during nighttime driving, the reflectance of the variable reflectance mirror reflective element is electrically reduced; and wherein the vehicular driver monitoring system, responsive to determining that the image data captured by the camera is not suitable for monitoring the driver present in the interior cabin of the vehicle, limits electrical reduction of the reflectance of the variable reflectance mirror reflective element to provide at least a first minimum threshold transmission level of NIR light passing through the variable reflectance mirror reflective element.

24. The vehicular driver monitoring system of claim 23, wherein the vehicular driver monitoring system, based on processing at the ECU of image data captured by the camera, determines that the image data captured by the camera is not suitable for monitoring the driver present in the interior cabin of the vehicle.

25. The vehicular driver monitoring system of claim 23, wherein, when the variable reflectance mirror reflective element provides less than the first minimum threshold transmission level of NIR light passing through the variable reflectance mirror reflective element, image data captured by the camera is not suitable for monitoring the driver, and wherein, when the variable reflectance mirror reflective element provides at least the first minimum threshold transmission level of NIR light passing through the variable reflectance mirror reflective element, image data captured by the camera is suitable for monitoring the driver.

26. The vehicular driver monitoring system of claim 25, wherein the vehicular driver monitoring system, based on processing of image data captured by the camera, adjusts limits on the electrical reduction of the reflectance of the variable reflectance mirror reflective element so that image data captured by the camera is suitable for monitoring the driver.

27. The vehicular driver monitoring system of claim 23, wherein the variable reflectance mirror reflective element comprises (i) a principal viewing region, (ii) a camera region and (iii) a light emitter region, and wherein reflectance of the variable reflectance mirror reflective element at the principal viewing region is adjusted separate from reflectance of the variable reflectance mirror reflective element at the camera region and the light emitter region.

28. The vehicular driver monitoring system of claim 27, wherein the vehicular driver monitoring system electrically reduces reflectance of the variable reflectance mirror reflective element at the principal viewing region and limits electrical reduction of the reflectance of the variable reflectance mirror reflective element at the camera region and at the light emitter region so that the variable reflectance mirror reflective element provides at least the first minimum threshold transmission level of NIR light passing through the variable reflectance mirror reflective element at the camera region and at the light emitter region.

29. The vehicular driver monitoring system of claim 27, wherein the camera region and the light emitter region are established via electrically isolating deletion lines through electrically conductive films of the variable reflectance mirror reflective element.

30. The vehicular driver monitoring system of claim 23, wherein the vehicular driver monitoring system sets a minimum threshold level of reflectance of the variable reflectance mirror reflective element to limit electrical reduction of the reflectance of the variable reflectance mirror reflective element.

31. The vehicular driver monitoring system of claim 23, wherein the vehicular driver monitoring system sets a maximum threshold level of electrical current applied to the variable reflectance mirror reflective element to limit electrical reduction of the reflectance of the variable reflectance mirror reflective element.

32. The vehicular driver monitoring system of claim 23, wherein the vehicular driver monitoring system adjusts limits on the electrical reduction of the reflectance of the variable reflectance mirror reflective element based on a temperature at the variable reflectance mirror reflective element.

33. The vehicular driver monitoring system of claim 32, wherein, based on the temperature at the variable reflectance mirror reflective element being less than a threshold temperature, reflectance of the variable reflectance mirror reflective element is adjustable based on a first minimum threshold level of reflectance, and wherein, based on the temperature at the variable reflectance mirror reflective element being greater than the threshold temperature, reflectance of the variable reflectance mirror reflective element is adjustable based on a second minimum threshold level of reflectance, and wherein the second minimum threshold level of reflectance is less than the first minimum threshold level of reflectance.

34. A vehicular occupant monitoring system, the vehicular occupant monitoring system comprising:

a vehicular interior rearview mirror assembly configured to attach at an interior portion of a vehicle equipped with the vehicular occupant monitoring system, wherein the vehicular interior rearview mirror assembly comprises a mirror head adjustable about a mounting structure;

wherein the mirror head accommodates a variable reflectance mirror reflective element;

a camera accommodated by the mirror head and operable to capture image data, wherein the camera views through the variable reflectance mirror reflective element;

an electronic control unit (ECU) comprising electronic circuitry and associated software, wherein the electronic circuitry comprises an image processor for processing image data captured by the camera;

wherein the ECU is disposed within the mirror head;

a light emitter accommodated by the mirror head and electrically operable to emit near infrared (NIR) light, and wherein NIR light emitted by the light emitter passes through the variable reflectance mirror reflective element to illuminate at least a driver region and a front passenger region of an interior cabin of the vehicle;

wherein, with the vehicular interior rearview mirror assembly attached at the interior portion of the vehicle, and when the light emitter is electrically operated to emit NIR light, the camera captures image data representative of NIR light reflected from within the interior cabin of the vehicle that passes through the variable reflectance mirror reflective element;

wherein, responsive to detection at the variable reflectance mirror reflective element of glare light emanating from a rear approaching vehicle during nighttime driving, the reflectance of the variable reflectance mirror reflective element is electrically reduced;

wherein, with the vehicular interior rearview mirror assembly attached at the interior portion of the vehicle, and with the mirror head adjusted relative to the mounting structure to provide a rearward field of view to a driver of the vehicle, the camera views the driver region and the front passenger region of an interior cabin of the vehicle;

wherein the vehicular occupant monitoring system, based on processing at the ECU of image data captured by the camera, determines presence of a passenger at the front passenger region of the interior cabin of the vehicle;

wherein the vehicular occupant monitoring system, responsive to determining presence of the passenger at the front passenger region of the interior cabin of the vehicle, is operable to adjust operation of the light emitter to increase an intensity of NIR light emitted by the light emitter;

wherein the vehicular occupant monitoring system, responsive to determining presence of the passenger at the front passenger region of the interior cabin of the vehicle, limits electrical reduction of the reflectance of the variable reflectance mirror reflective element to provide at least a first minimum threshold transmission level of NIR light passing through the variable reflectance mirror reflective element; and wherein the vehicular occupant monitoring system, responsive to determining that a passenger is not present at the front passenger region of the interior cabin of the vehicle, limits electrical reduction of the reflectance of the variable reflectance mirror reflective element so that the variable reflectance mirror reflective element provides at least a second minimum threshold transmission level of NIR light that is less than the first minimum threshold transmission level.

35. The vehicular occupant monitoring system of claim 34, wherein the vehicular occupant monitoring system sets a maximum threshold level of electrical current applied to the variable reflectance mirror reflective element to limit electrical reduction of the reflectance of the variable reflectance mirror reflective element.

36. The vehicular occupant monitoring system of claim 34, wherein the vehicular interior rearview mirror assembly further comprises an actuator that is electrically operable to adjust the mirror head relative to the mounting structure to adjust the rearward view of the driver of the vehicle.

37. The vehicular occupant monitoring system of claim 36, wherein the camera moves in tandem with the mirror head when, with the vehicular interior rearview mirror assembly attached at the interior portion of the vehicle, the mirror head is adjusted relative to the mounting structure, and wherein the vehicular occupant monitoring system, responsive to determining presence of the passenger at the front passenger region of the interior cabin of the vehicle, electrically operates the actuator to move the mirror head relative to the mounting structure so that the camera at least partially views the front passenger region of the vehicle.

38. The vehicular occupant monitoring system of claim 34, wherein the variable reflectance mirror reflective element comprises (i) a principal viewing region, (ii) a camera region and (iii) a light emitter region, and wherein reflectance of the variable reflectance mirror reflective element at the principal viewing region is adjusted separate from reflectance of the variable reflectance mirror reflective element at the camera region and the light emitter region.

39. The vehicular occupant monitoring system of claim 34, wherein the vehicular occupant monitoring system, based on processing at the ECU of image data captured by the camera, monitors the driver present in the interior cabin of the vehicle.

40. The vehicular occupant monitoring system of claim 34, wherein the vehicular occupant monitoring system, based on processing of image data captured by the camera, adjusts limits on the electrical reduction of the reflectance of the variable reflectance mirror reflective element so that image data captured by the camera is suitable for at least one selected from the group consisting of (i) a driver monitoring function and (ii) an occupant monitoring function.

* * * * *

UNITED STATES PATENT AND TRADEMARK OFFICE
CERTIFICATE OF CORRECTION

PATENT NO. : 12,393,089 B2  
APPLICATION NO. : 18/508351  
DATED : August 19, 2025  
INVENTOR(S) : Michael J. Baur Page 1 of 1

It is certified that error appears in the above-identified patent and that said Letters Patent is hereby corrected as shown below:

In the Specification

Column 9
Line 47, "delta (A)" should be --delta (Δ)--

Signed and Sealed this
Sixteenth Day of September, 2025

Coke Morgan Stewart
*Acting Director of the United States Patent and Trademark Office*